United States Patent
Bhatia et al.

(10) Patent No.: US 12,536,324 B2
(45) Date of Patent: Jan. 27, 2026

(54) SYSTEMS AND METHODS FOR LINKING DEVICES AND PROTECTING DATA

(71) Applicant: ON THE WAY LLC, Irving, TX (US)

(72) Inventors: Niraj Bhatia, Irving, TX (US); Jacob Pena, Irving, TX (US); Anita Srivastava, Irving, TX (US); Arjun Srivastava, Irving, TX (US)

(73) Assignee: ON THE WAY LLC, Irving, TX (US)

( * ) Notice: Subject to any disclaimer, the term of this patent is extended or adjusted under 35 U.S.C. 154(b) by 54 days.

(21) Appl. No.: 18/628,561

(22) Filed: Apr. 5, 2024

(65) Prior Publication Data

US 2024/0338480 A1     Oct. 10, 2024

Related U.S. Application Data

(60) Provisional application No. 63/494,947, filed on Apr. 7, 2023.

(51) Int. Cl.
| | |
|---|---|
| *G06F 21/62* | (2013.01) |
| *G01C 21/34* | (2006.01) |
| *G01C 21/36* | (2006.01) |
| *G06Q 30/0207* | (2023.01) |
| *G06Q 30/0601* | (2023.01) |
| *G06Q 50/00* | (2024.01) |

(52) U.S. Cl.
CPC ..... *G06F 21/6245* (2013.01); *G01C 21/3438* (2013.01); *G01C 21/3691* (2013.01); *G01C 21/3697* (2013.01); *G06Q 30/0207* (2013.01); *G06Q 30/0633* (2013.01); *G06Q 50/01* (2013.01); *G06F 2221/2111* (2013.01)

(58) Field of Classification Search
CPC ............ G06F 21/6245; G01C 21/3438; G01C 21/3691; G01C 21/3697; G06Q 30/0207; G06Q 30/0633; G06Q 650/01
See application file for complete search history.

(56) References Cited

U.S. PATENT DOCUMENTS

| | | | |
|---|---|---|---|
| 2012/0008526 A1* | 1/2012 | Borghei | H04W 4/021 370/254 |
| 2015/0181380 A1 | 6/2015 | Altman et al. | |
| 2019/0162546 A1* | 5/2019 | Duale | G01C 21/3438 |
| 2022/0333946 A1 | 10/2022 | Sheha et al. | |

OTHER PUBLICATIONS

International Search Report and Written Opinion in PCT/US2024/023451 dated Jul. 31, 2024.

\* cited by examiner

*Primary Examiner* — Clayton R Williams

(74) *Attorney, Agent, or Firm* — Foley & Lardner LLP

(57) ABSTRACT

Systems, methods, and computer-readable storage media for linking devices and protecting data. One method includes receiving, from an inviter device, a link up request associated with a link up location, establishing one or more data channels with the inviter device, providing the link up request to each of a plurality of invitee devices, establishing the one or more data channels with the first invitee device, generating and providing, to the first invitee device via a first graphical user interface (GUI) of an application, a first proposed route to the link up location and at least one first location of one of the plurality of invitee devices or the inviter device, collecting environmental data of the inviter device and the plurality of invitee devices, providing a location of the first invitee device, and disconnecting the one or more data channels connecting the one or more processors and the first invitee device.

20 Claims, 25 Drawing Sheets

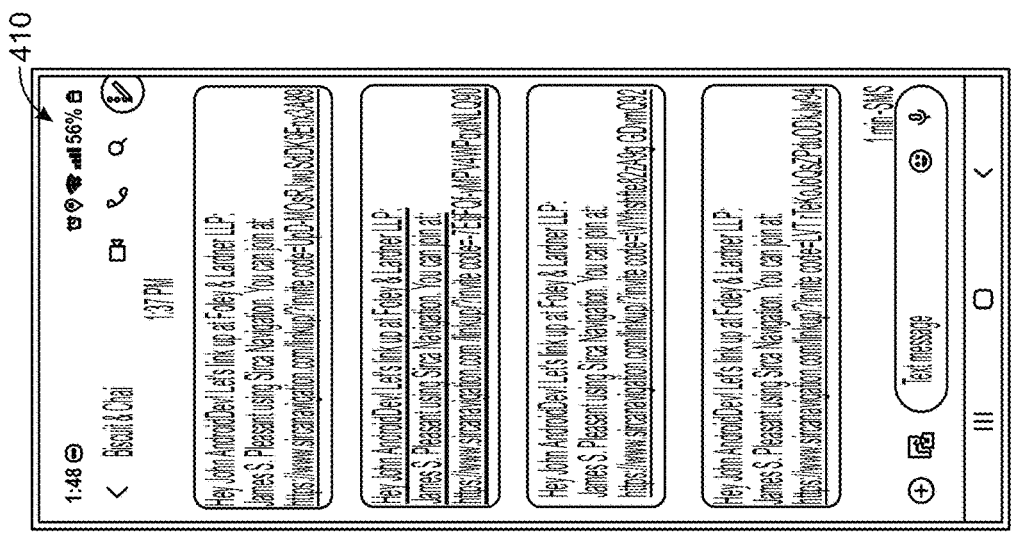
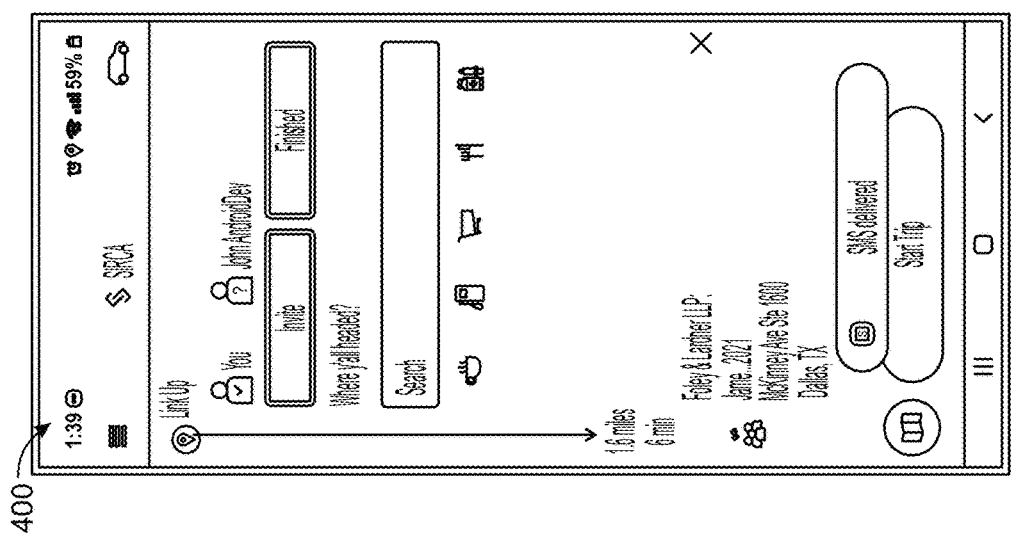
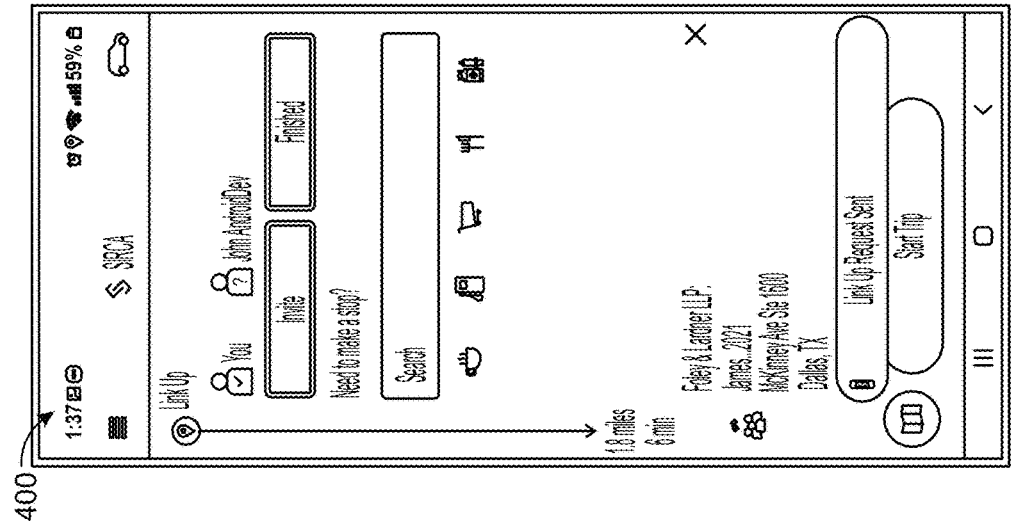
FIG. 4F

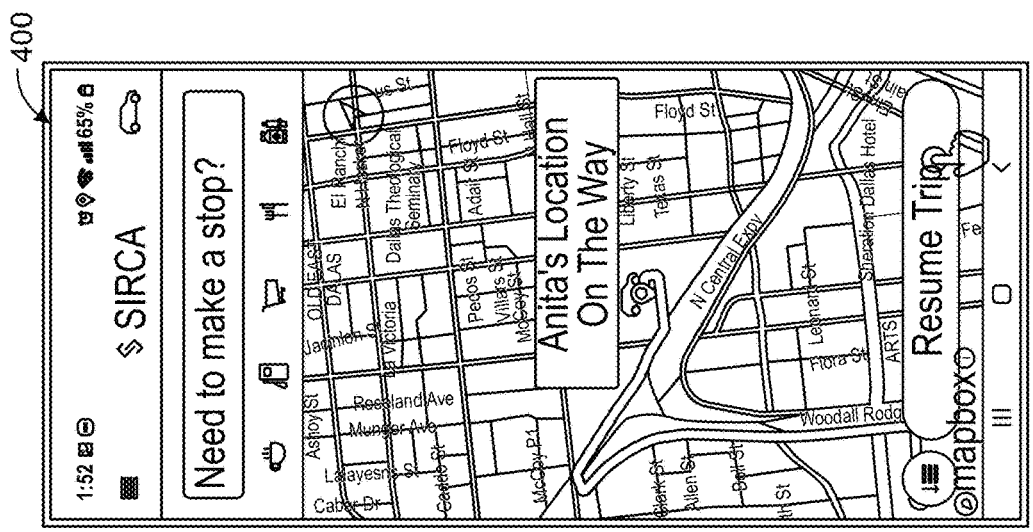
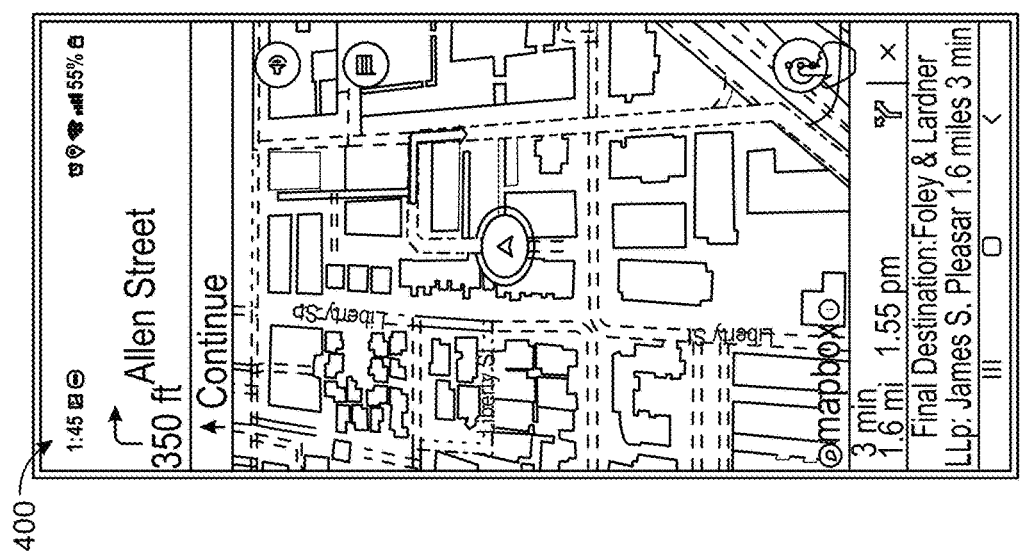
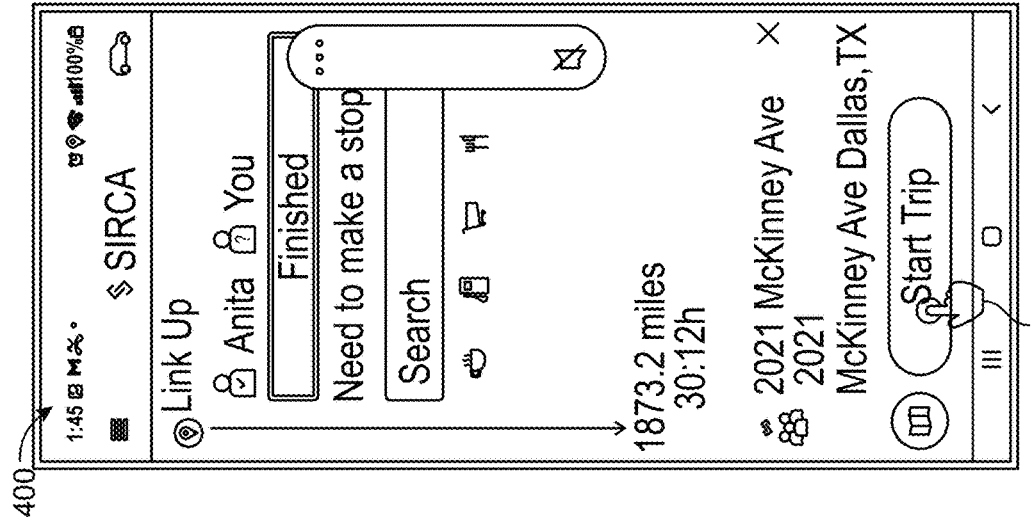
FIG. 4H

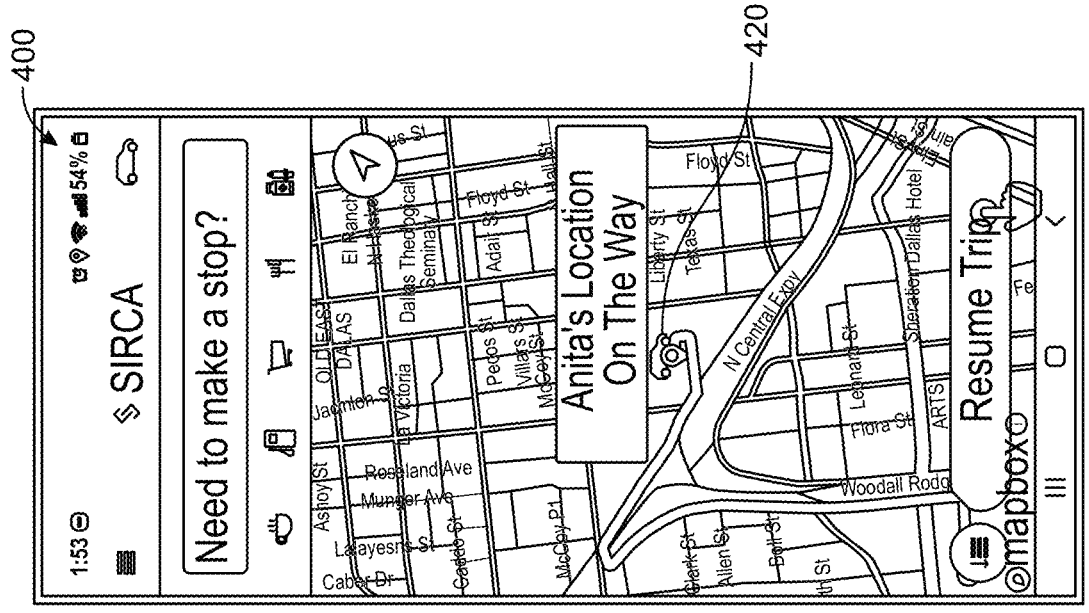
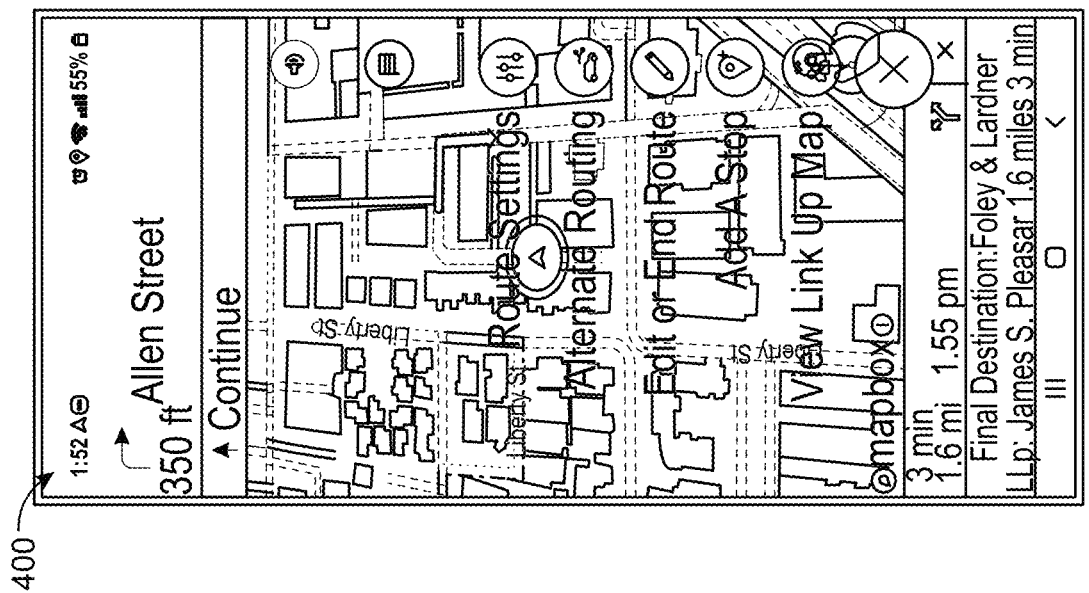
FIG. 4J

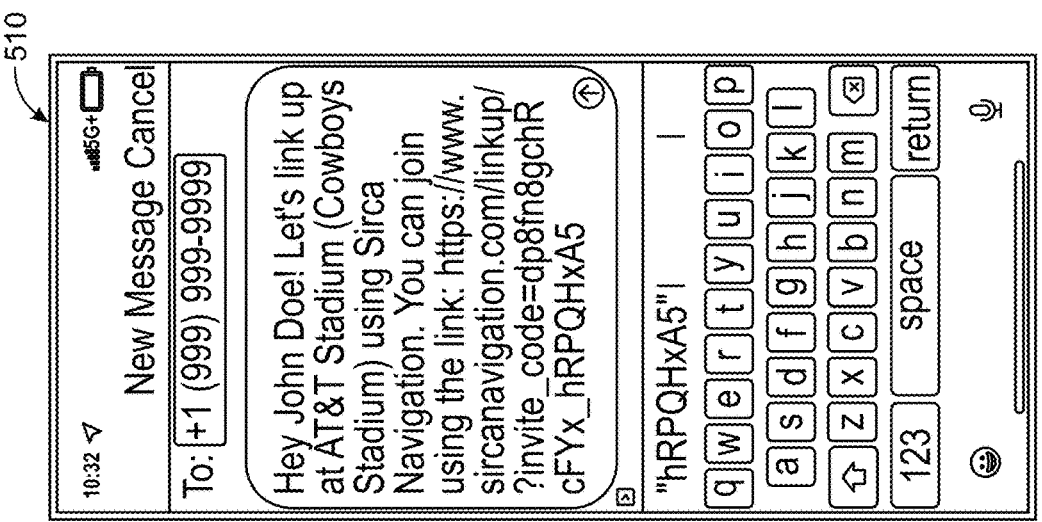
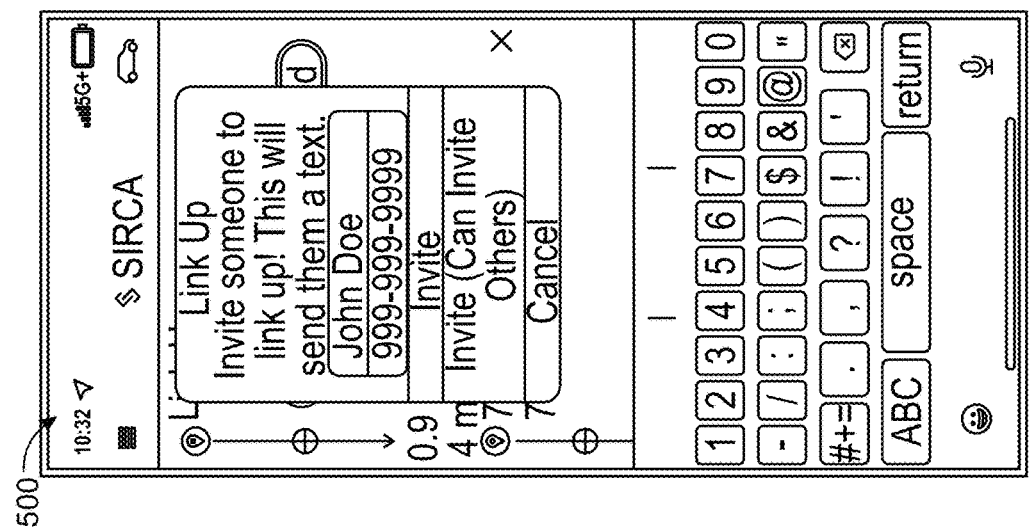
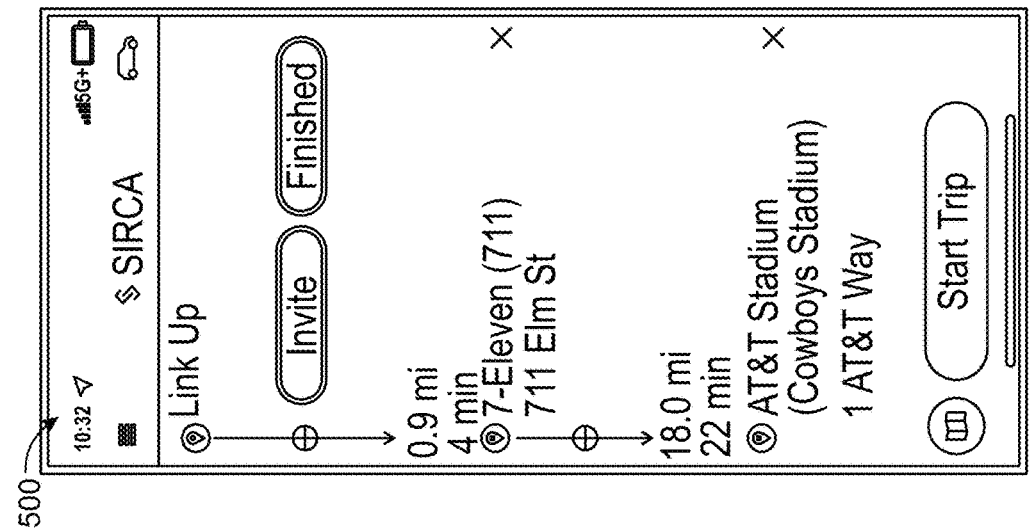
FIG. 5A

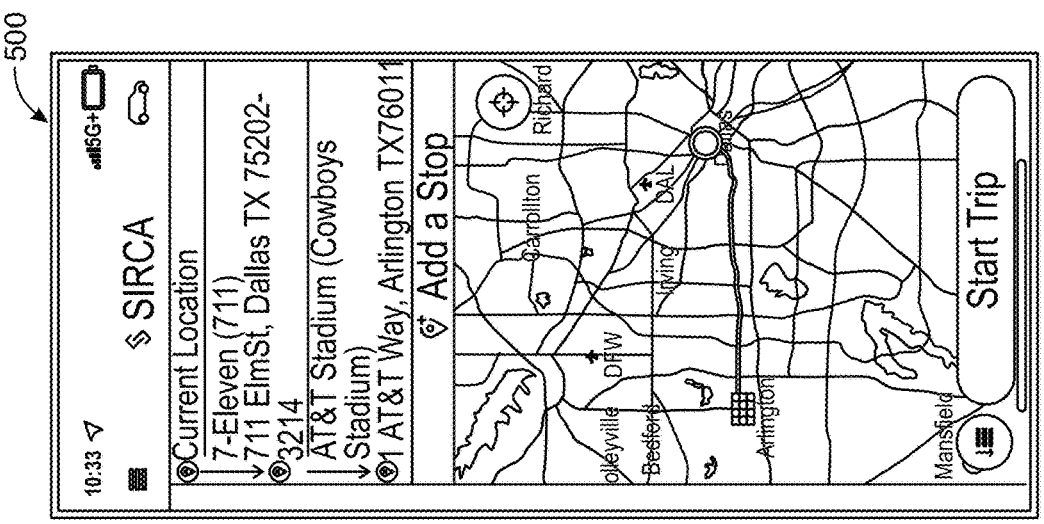
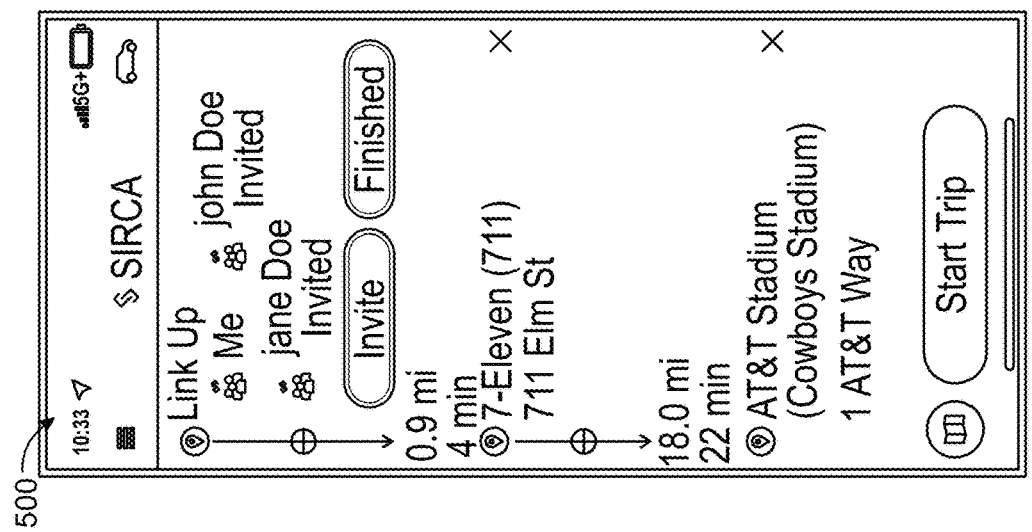
FIG. 5B
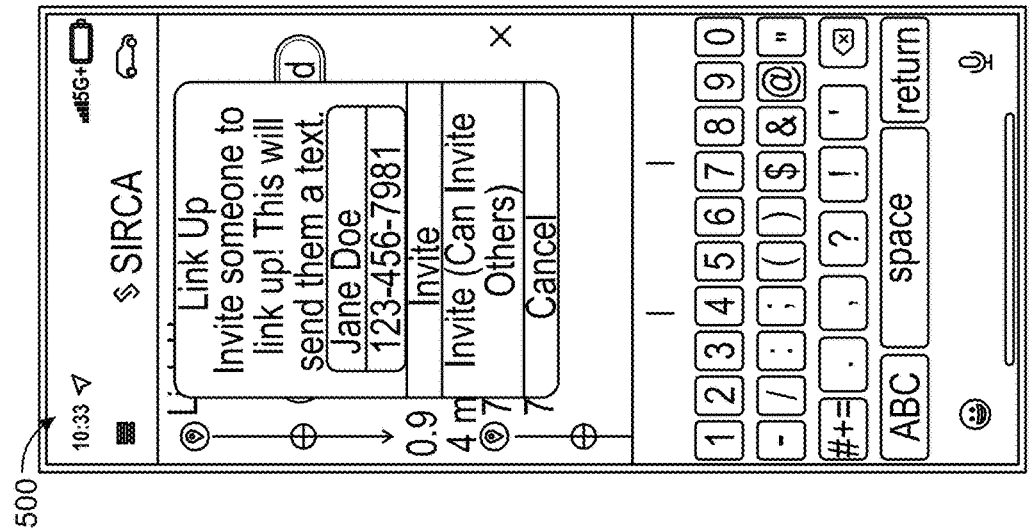

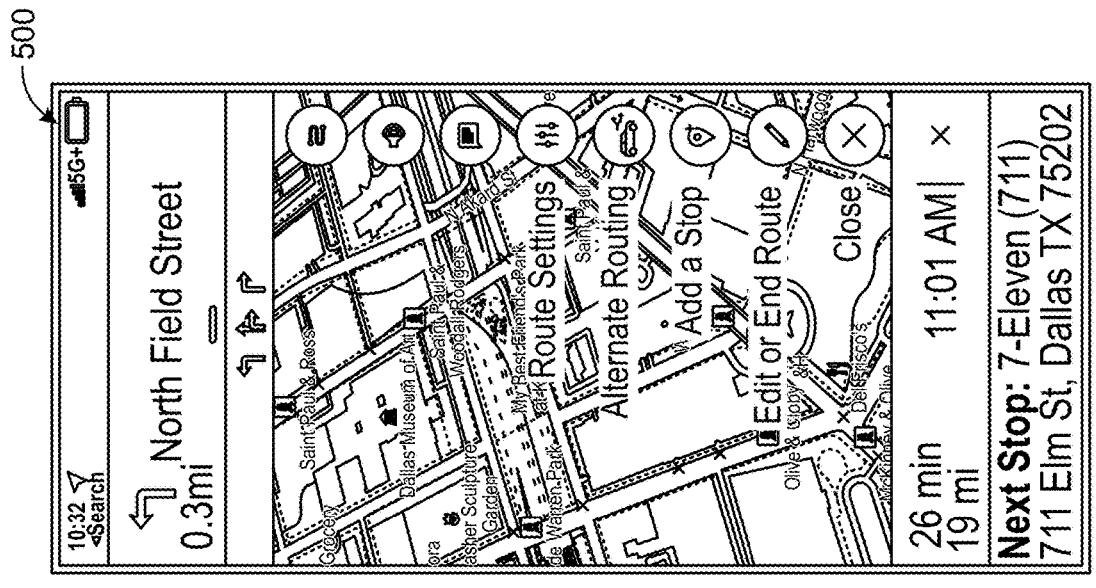
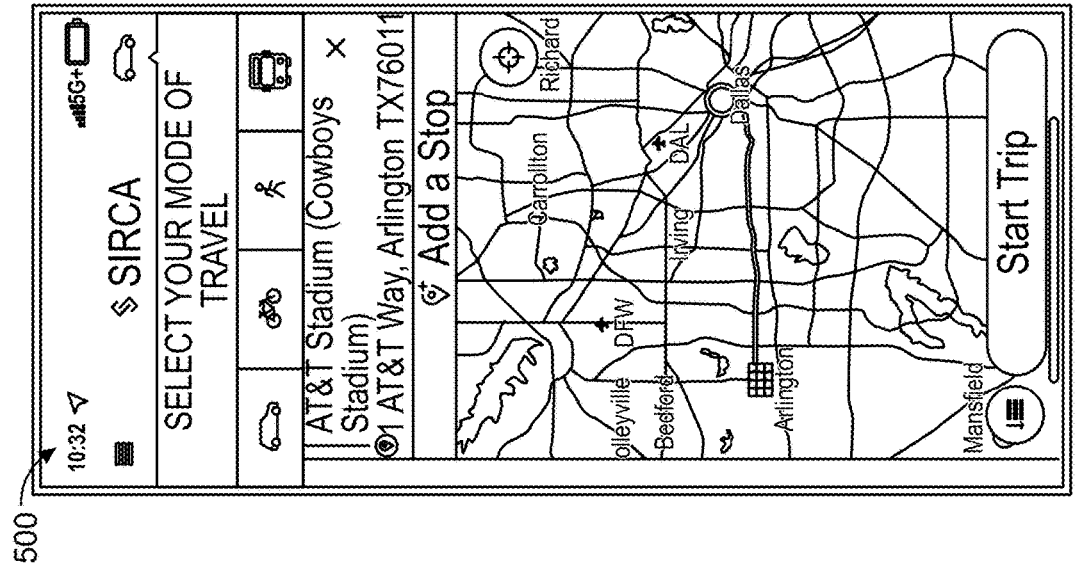
FIG. 5C

| WHAT YOU LOOK LIKE TO YOUR MAP APP | WHAT YOU LOOK LIKE TO SIRCA | WHAT YOU LOOK LIKE TO YOUR MAP APP | WHAT YOU LOOK LIKE TO SIRCA |
|---|---|---|---|
| • Name: Stu Potts<br>• Male, 23 years old<br>• Birthday: March 2, 1997<br>• No longer in a relationship as of February 14, 2020<br>• Ordered Joe's Pizza at 11:20pm on Mon, Tues, Wed, Thurs, Fri.<br>• Ordered a large mushroom pie and 2 pints of icecream.<br>• Played "You Belong With Me" by Taylor Swift 473 times on spotify since Friday. | • User 184027462<br>• Gender: Unknown<br>• Age: Unknown<br>• Birthday: Unknown<br>• Likes Pizza | • Name: Jean-Eric Hughman<br>• Female, 31 years old<br>• Birthday: September 9, 1988<br>• Fights with her mom about getting married twice a week<br>• Hasn't had a boyfriend since 2015<br>• Weakness for kittens<br>• Edits her beach pics using popular photo editing app | • User 192828455<br>• Gender: Unknown<br>• Age: Unknown<br>• Birthday: Unknown<br>• Likes Boba |

FIG. 6

| WHAT YOU LOOK LIKE TO YOUR MAP APP | WHAT YOU LOOK LIKE TO SIRCA |
|---|---|
| • Name: Stu Potts<br>• Male, 23 years old<br>• Birthday: March 2, 1997<br>• No longer in a relationship as of February 14, 2020<br>• Ordered Joe's Pizza at 11:20pm on Mon, Tues, Wed, Thurs, Fri.<br>• Ordered a large mushroom pie and 2 pints of icecream.<br>• Played "You Belong With Me" by Taylor Swift 473 times on spotify since Friday. | • User 184027462<br>• Gender: Unknown<br>• Age: Unknown<br>• Birthday: Unknown<br>• Likes Pizza |

| WHAT YOU LOOK LIKE TO YOUR MAP APP | WHAT YOU LOOK LIKE TO SIRCA |
|---|---|
| • Name: Ike Peekchurs<br>• Male, 18 years old<br>• Birthday: October 31, 2001<br>• Eats 9 bags of chips a week<br>• Goes to the University gym once every 3 months<br>• Thinks the government is spying on him<br>• Mother gave birth 5 days before the due date | • User 171592047<br>• Gender: Unknown<br>• Age: Unknown<br>• Birthday: Unknown<br>• Likes Burgers |

FIG. 6 (Continued)

| WHAT YOU LOOK LIKE TO YOUR MAP APP | WHAT YOU LOOK LIKE TO SIRCA |
|---|---|
| • Name: Myart Hertz<br>• Female, 38 years old<br>• Birthday: January 18, 1982<br>• Still reads teen romance novels<br>• Binged "The Bachelor" for 6 hours last night<br>• Can't parallel park properly<br>• Recently uninstalled and then reinstalled a dating app<br>• Likes Greek food | • User 032471849<br>• Gender: Unknown<br>• Age: Unknown<br>• Birthday: Unknown<br>• Likes Greek food |

| WHAT YOU LOOK LIKE TO YOUR MAP APP | WHAT YOU LOOK LIKE TO SIRCA |
|---|---|
| • Name: Yusilly Gooz<br>• Female, 20 years old<br>• Birthday: December 21, 1999<br>• Listens to underground rap on the way to work<br>• Texts her best friend approximately 726 times a day<br>• Smells like apples and buys X brand perfume every 3 months<br>• Just bought 3 cookbooks and has ordered takeout everyday this week. | • User 1593287723<br>• Gender: Unknown<br>• Age: Unknown<br>• Birthday: Unknown<br>• Likes Coffee |

FIG. 6 (Continued)

| WHAT YOU LOOK LIKE TO YOUR MAP APP | WHAT YOU LOOK LIKE TO SIRCA |
|---|---|
| • Name: Namesh Nameman<br>• Male, 18 years old<br>• Birthday: March 9, 2002<br>• Height: 5'9"<br>• Recently searched: "Is it safe to eat 2 week old pizza"<br>• Checks his 8th grade crush's facebook profile twice a week<br>• Has commitment issues | • User 128364462<br>• Gender: Unknown<br>• Age: Unknown<br>• Birthday: Unknown<br>• Likes Cheesecake |

FIG. 6 (Continued)

SYSTEMS AND METHODS FOR LINKING DEVICES AND PROTECTING DATA

CROSS-REFERENCE TO RELATED PATENT APPLICATIONS

This application claims priority to U.S. Provisional Application No. 63/494,947, filed Apr. 7, 2023, which is incorporated herein by reference in its entirety and for all purposes.

BACKGROUND

In a computer networked environment such as the internet, entities such as people or companies access content for display in mobile applications. People and companies that provide the content may desire to link devices and protect data.

SUMMARY

Some implementations relate to a computer-implemented method for linking devices and protecting data, the computer-implemented method including receiving, by one or more processors from an inviter device, a link up request associated with a link up location. The method further including establishing, by the one or more processors, one or more data channels with the inviter device. The method further including providing, by the one or more processors, the link up request to each of a plurality of invitee devices, the link up request including the link up location. The method further including in response to receiving a first acceptance of the link up request from a first invitee device of the plurality of invitee devices, establishing, by the one or more processors, the one or more data channels with the first invitee device. The method further including generating and providing, by the one or more processors to the first invitee device via a first graphical user interface (GUI) of an application, a first proposed route to the link up location and at least one first location of one of the plurality of invitee devices or the inviter device, wherein the first proposed route is based on a first geographic location of the first invitee device. The method further including in response to receiving a second acceptance of the link up request from a second invitee device of the plurality of invitee devices, establishing, by the one or more processors, the one or more data channels with the second invitee device. The method further including generating and presenting, by the one or more processors to the second invitee device via a second GUI of the application, a second proposed route to the link up location, wherein the second proposed route is based on a second geographic location of the second invitee device. The method further including collecting, by the one or more processors via the one or more data channels, environmental data of the inviter device and the plurality of invitee devices. The method further including providing, by the one or more processors to the inviter device via a third GUI of the application, a location of the first invitee device and the second invitee device based on the environmental data, wherein the location of the first invitee device and the second invitee device is presented on the third GUI of the application. The method further including in response to determining at least one of the first invitee device or the second invitee device completed the link up request at the link up location, disconnecting, by the one or more processors, the one or more data channels connecting the one or more processors and the at least one of the first invitee device or the second invitee device.

In some implementations, the link up request is associated with a predetermined link up with predetermined invitee devices, the computer-implemented method further including determining, by the one or more processors, the predetermined link up based on social media data, wherein the predetermined link up is determined based on identifying trends in the social media data and wherein the first proposed route is presented on the first invitee device, and wherein the presentation includes an estimated time of arrival (ETA) for each of the inviter device, the first invitee device, and the second invitee device.

In some implementations, the method further including determining, by the one or more processors, a stop along the first proposed route or the second proposed route and providing, by the one or more processors, an intermediate location to at least one of the first invitee device or the second invitee device.

In some implementations, the method further including receiving, by the one or more processors, a list of items associated with the link up request, determining, by the one or more processors, one or more stops within a geographic area of the link up request that includes one or more of the list of items in stock, in response to receiving the first acceptance, offering, by the one or more processors, the one or more stops as selectable elements via the first GUI of the application, wherein determining the stop and providing the intermediate location are in response to receiving a selection of one of the selectable elements, and updating, by the one or more processors, the list of items indicating at least one item of the list of items is attributed to the first inviter device.

In some implementations, the method further including updating, by the one or more processors, the one or more stops based on either the first proposed route or the second proposed route, wherein each of the one or more stops offered further include an incentive presented with a selectable element of the selectable elements.

In some implementations, the method further including in response to determining at least one of the first invitee device or the second invitee device arrived at the link up location, sharing, by the one or more processors, a geographic location of the inviter device to the at least one of the first invitee device or the second invitee device.

In some implementations, the link up request is a public link up request configured to share the link up request to a link up marketplace, the computer-implemented method further including generating and providing, by the one or more processors via the application, the link up request to a plurality of public invitee devices, the link up request including the link up location, wherein the plurality of public invitee devices are determined based on an enrollment dataset.

In some implementations, the first acceptance includes privacy parameters for sharing data of the first invitee device, and wherein the privacy parameters includes a plurality of data sharing levels associated with a type and amount of the data shared.

In some implementations, a first level of the plurality of data sharing levels configures the one or more processors to share the data of the first invitee device with at most the inviter device, and wherein a second level of the plurality of data sharing levels configures the one or more processors to share the data of the first invitee device with at most the inviter device and one of the plurality of invitee devices, and wherein a third level of the plurality of data sharing levels configures the one or more processors to share the data of the first invitee device with the inviter device and one of the plurality of invitee devices.

In some implementations, a first level of the plurality of data sharing levels configures the one or more processors to share unprotected data of the data of the first invitee device with at most the inviter device, and wherein a second level of the plurality of data sharing levels configures the one or more processors to share the unprotected data of the data of the first invitee device with the inviter device and one of the plurality of invitee devices, and wherein a third level of the plurality of data sharing levels configures the one or more processors to share the unprotected data and protected data of the data of the first invitee device with the inviter device and one of the plurality of invitee devices.

In some implementations, the first invitee device is associated with a profile of the application, and wherein the first proposed route is based on a default location of the profile.

In some implementations, the first GUI and second GUI include to a look and feel (LF) theme based on the link up request or the link up location, the link up request provided to the plurality of invitee devices include a customized invitation including content corresponding with the link up request or link up location, the first location of one of the plurality of invitee devices or the inviter device is a first visual indicator when the one of the plurality of invitee devices or the inviter device is location sharing, and the first location of one of the plurality of invitee devices or the inviter device is a second visual indicator when the one of the plurality of invitee devices or the inviter device is not location sharing.

In some implementations, in response to receiving the first acceptance, the computer-implemented method further including activating one or more safety features on the first invitee device, wherein the one or more safety features include enabling a third-party device to track the first invitee device and establishing another data channel between the third-party device and the first invitee device to exchange communicates or messages.

In some implementations, the received link up location is a general location, the computer-implemented method further including in response to receiving the first acceptance of the link up request, determining, by the one or more processing circuits, a central location for the link up location based on the first geographic location of the first invitee device and a geographic location of the inviter device, wherein the first proposed route to the link up location is to the central location.

In some implementations, generating and providing, via the first GUI of the application, the first proposed route to the link up location includes at least one of a first selectable element including a request a rideshare or carpool for the link up, a second selectable element including an offer for pick up by the inviter device or the plurality of invitee devices, or a third selectable element including a media recommendation the first invitee device can output as audio during the first proposed route to the link up location.

Some implementations relate to a data protection system for linking devices and protecting data, the data protection system including a data processing system including memory and one or more processors configured to receive, from an inviter device, a link up request associated with a link up location. The one or more processors further configured to establish one or more data channels with the inviter device. The one or more processors further configured to provide the link up request to each of a plurality of invitee devices, the link up request including the link up location. The one or more processors further configured to in response to receiving a first acceptance of the link up request from a first invitee device of the plurality of invitee devices, establish the one or more data channels with the first invitee device. The one or more processors further configured to generate and provide, to the first invitee device via a first graphical user interface (GUI) of an application, a first proposed route to the link up location and at least one first location of one of the plurality of invitee devices or the inviter device, wherein the first proposed route is based on a first geographic location of the first invitee device. The one or more processors further configured to in response to receiving a second acceptance of the link up request from a second invitee device of the plurality of invitee devices, establish the one or more data channels with the second invitee device. The one or more processors further configured to generate and present, to the second invitee device via a second GUI of the application, a second proposed route to the link up location, wherein the second proposed route is based on a second geographic location of the second invitee device. The one or more processors further configured to collect, via the one or more data channels, environmental data of the inviter device and the plurality of invitee devices. The one or more processors further configured to provide, to the inviter device via a third GUI of the application, a location of the first invitee device and the second invitee device based on the environmental data, wherein the location of the first invitee device and the second invitee device is presented on the third GUI of the application. The one or more processors further configured to in response to determining at least one of the first invitee device or the second invitee device completed the link up request at the link up location, disconnect the one or more data channels connecting the data processing system and the at least one of the first invitee device or the second invitee device.

In some implementations, the link up request is associated with a predetermined link up with predetermined invitee devices, the one or more processors further configured to determine the predetermined link up based on social media data, wherein the predetermined link up is determined based on identifying trends in the social media data and wherein the first proposed route is presented on the first invitee device, and wherein the presentation includes an estimated time of arrival (ETA) for each of the inviter device, the first invitee device, and the second invitee device.

In some implementations, the one or more processors further configured to determine a stop along the first proposed route or the second proposed route and provide an intermediate location to at least one of the first invitee device or the second invitee device.

In some implementations, the one or more processors further configured to receive a list of items associated with the link up request, determine one or more stops within a geographic area of the link up request that includes one or more of the list of items in stock, in response to receiving the first acceptance, offer the one or more stops as selectable elements via the first GUI of the application, wherein determining the stop and providing the intermediate location are in response to receiving a selection of one of the selectable elements, update the list of items indicating at least one item of the list of items is attributed to the first inviter device, update the one or more stops based on either the first proposed route or the second proposed route, wherein each of the one or more stops offered further include an incentive presented with a selectable element of the selectable elements.

Some implementations relate to a computer-implemented method for linking devices and protecting data, the computer-implemented method including receiving, by one or more processors, a link up request including a link up location. The method further including providing, by the one or more processors to a protection system, an acceptance of the link up request. The method further including in response to the acceptance, establishing, by the one or more processors, a data channel with the protection system. The method further including receiving and presenting, by the one or more processors via a graphical user interface (GUI) of an application, a proposed route to the link up location and at least one location of one of a plurality of invitee devices or an inviter device, wherein the proposed route is based on a first geographic location of the one or more processors. The method further including collecting and providing, by the one or more processors via the data channel, environmental data. The method further including receiving and presenting, by the one or more processors via the GUI of the application, a location of the at least one of the plurality of invitee devices or the inviter device. The method further including in response to determining the one or more processors completed the link up request at the link up location, disconnecting, by the one or more processors, the data channel connecting the one or more processors and the protection system.

Some implementations relate a user device including one or more processing circuits to receive a link up request comprising a link up location, provide, to a protection system, an acceptance of the link up request, in response to the acceptance, establish a data channel with the protection system, receive and present, via a graphical user interface (GUI) of an application, a proposed route to the link up location and at least one location of one of a plurality of invitee devices or an inviter device, wherein the proposed route is based on a first geographic location of the user device, collect and provide, via the data channel, environmental data, receive and present, via the GUI of the application, a location of the at least one of the plurality of invitee devices or the inviter device, and in response to determining the one or more processors completed the link up request at the link up location, disconnect the data channel connecting the one or more processors and the protection system.

BRIEF DESCRIPTION OF THE DRAWINGS

FIGS. 4A-4K are example illustrations of a graphical user interface, according to some embodiments.

FIGS. 5A-5C are example illustrations of a graphical user interface, according to some embodiments.

FIG. 6 are example illustrations of protecting data associated with link ups, according to some embodiments.

It will be recognized that some or all of the figures are schematic representations for purposes of illustration. The figures are provided for the purpose of illustrating one or more embodiments with the explicit understanding that they will not be used to limit the scope or the meaning of the claims.

DETAILED DESCRIPTION

The present disclosure is directed to systems and methods for protecting data and linking devices. Protecting data and linking devices provide improvements in privacy of consumer data specific to an individual while the graphical user interface (GUI), including performing a link up request, provide additional improvement to mapping systems that can link devices while protecting data. This approach allows data/mapping systems and architectures to maintain the privacy of consumer data while providing linking capabilities between multiple devices such that overall design of the data/mapping systems and architectures are improved. Thus, aspects of the present disclosure address problems in data protection by designing and providing a linking system that obfuscates consumer data while allowing multiple consumer to link up.

Additionally, various aspects of the methods and systems described herein are directed to recommending and playing audiovisual media at adjusted playback rates based on predicted travel durations along a navigation route. Adjusting playback rates of audiovisual media provides improved methods of consuming media during travel by increasing the completion rate of audiovisual media in a single traveling block, thus increasing enjoyment, retention, understanding, and value (e.g., monetary) of the reproduced audiovisual media. Additionally, aspects of the present disclosure provide various technical improvements to audiovisual playback technology and media sharing technology. Traditional approaches to audiovisual media playback involve reproducing the content at a single, default playback rate (e.g., speed), leading to uncompleted consumption of media during travel when the duration of the media exceeds the duration of travel. Aspects of the present disclosure allow for automatic adjustment of playback rates of outputted audiovisual media based on dynamic navigation conditions such that media may be completely consumed during travel, even when a default playback duration of the media exceeds the travel duration. Additional aspects of the present disclosure provide users with targeted media recommendations based on predicted travel durations. Additionally, the present disclosure allows for improved sharing of audiovisual content to parties within a group by disclosing methods and systems that can provide multiple users within a group with a single audiovisual media to consume during travel to a common destination while ensuring that each of the users is able to completely consume the audiovisual media during their respective navigations to the common destination.

Figure 1:
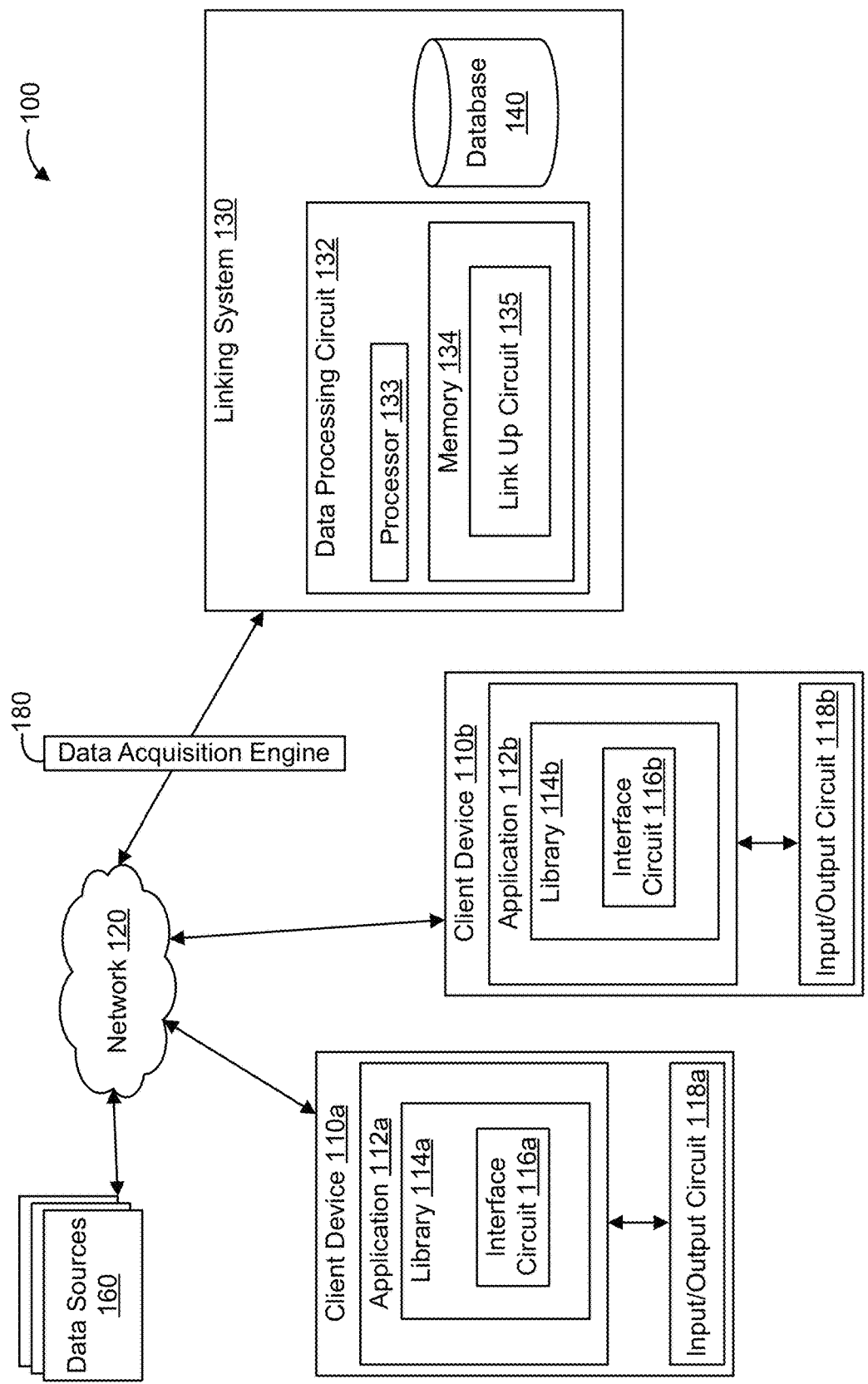
FIG. 1 is a block diagram depicting an implementation of a system for linking devices and protecting data, according to some embodiments.

Referring now to FIG. 1, a block diagram depicting an implementation of a system 100 for linking devices and protecting data, according to some embodiments. System 100 includes client devices 110*a* and 110*b* (collectively referred to herein as "client device 110"), linking system 130, data sources 160, and data acquisition engine 180. In various implementations, components of system 100 communicate over network 120. Network 120 may include computer networks such as the Internet, local, wide, metro or other area networks, intranets, satellite networks, other computer networks such as voice or data mobile phone communication networks, combinations thereof, or any other type of electronic communications network. In various implementations, network 120 facilitates secure communication between components of system 100. As a non-limiting example, network 120 may implement transport layer security (TLS), secure sockets layer (SSL), hypertext transfer protocol secure (HTTPS), and/or any other secure communication protocol.

In general, the client devices 110 can execute a software application (such as application 112, e.g., a web browser, an installed application, or other application) to retrieve content from other computing systems and devices over network 120. Such an application may be configured to retrieve interfaces from the linking system 130 (e.g., navigation interface for navigating to a link up). In one implementation, the client device 110 may execute a web browser application, which provides the interface (e.g., from link up circuit 135) on a viewport of the client device 110. The web browser application that provides the interface may operate by receiving input of a uniform resource locator (URL), such as a web address, from an input device (such as input/output circuit 118, e.g., a pointing device, a keyboard, a touch screen, or another form of input device). In response, one or more processors of the client device 110 executing the instructions from the web browser application may request data from another device connected to the network 120 referred to by the URL address (e.g., the linking system 130). The other device may then provide webpage data and/or other data to the client device 110, which causes the interface to be presented by the viewport of the client device 110. Accordingly, the browser window presents the interface to facilitate user interaction with the interface.

In another implementation, the client device 110 may execute a mobile application, which provides the interface (e.g., from link up circuit 135) on a viewport of the client device 110. The mobile application that provides the interface may operate by receiving input selecting the mobile application (e.g., to open the application) on the viewport of the client device, from an input device (such as input/output circuit 118). In response, one or more processors of the client device 110 executing the instructions from the mobile application may request data from another device connected to the network 120 referred to by the URL address (e.g., the linking system 130). The other device may then provide application data and/or other data to the client device 110, which causes the interface to be presented by the viewport of the client device 110. Accordingly, the mobile application presents the interface to facilitate user interaction with the interface.

Client device 110 (sometimes referred to herein as a "mobile device") may be a mobile computing device, smartphone, tablet, smart watch, smart sensor, or any other device configured to facilitate receiving, displaying, and interacting with content (e.g., web pages, mobile applications, etc.). Client device 110 may include an application 112 (shown as application 112a and 112b) to receive and display content and to receive user interaction with the content. For example, application 112 may be a web browser. Additionally, or alternatively, application 112 may be a mobile application associated with a specific entity. Client device 110 may also include an input/output circuit 118 for communicating data over network 120 (e.g., receive and transmit to linking system 130).

In various implementations, application 112 interacts with a linking system 130 to receive and provide environmental data (sometimes referred to as "activity data"), application content, network content, and online content. For example, application 112 may receive an information resource from the linking system 130. The information resources may include web-based content (e.g., web page) or application-based content (e.g., application installed on the client device 110). The information resources may include instructions (e.g., scripts, executable code, etc.) that when interpreted by application 112 cause application 112 to display a graphical user interface (GUI) such as an interactable web page and/or an interactive mobile application to a user. In various implementations, application 112 can include one or more application interfaces for presenting an application (e.g., mobile application, web-based application, virtual reality/augmented reality application, smart TV application and so on).

Application 112 is shown to include library 114 (shown as library 114a and 114b) having an interface circuit 116 (shown as interface circuit 116a and 116b). The library 114 may include a collection of interfacing tools contained in a package (e.g., application programming interface (API), web service, debugger, passthrough network interface, etc.). For example, library 114 may include an application programming interface (API) or a plurality of APIs. In another example, library 114 may include a web service. In yet another example, the library 114 may be an interfacing kit that includes an API, a debugger, and web services, and so on. In some implementations, library 114 includes one or more libraries having reusable functions that interface with a particular system software (e.g., iOS, Android, Linux, etc.). Library 114 may facilitate embedding functionality in application 112. For example, a link up participant may use library 114 to automatically transmit real-time location information (or near real-time location information, or last location information) of the client device 110 whenever a link up is in progress using the application 112. As a further example, library 114 may include a function configured to collect and report device analytics and a user may insert the function into the instructions of application 112 to cause the function to be called during specific actions of application 112 (e.g., during a link up as described in detail below). In some implementations, interface circuit 116 functionalities are provided by library 114.

Interface circuit 116 can be configured to provide one or more interfaces. In various implementations, the interfaces can be presented on an application interface of application 112 presented in the viewport of client device 110. The interfaces (e.g., user interfaces including graphical user interfaces (GUIs), head-up displays (HUDs), textual user interface (TUI), etc.) provided by the interface circuit 116 can include various functionality, such as enabling a user to create link up requests, accept link up requests, monitoring participates (invitee and inviter) of a link up request, access link up marketplaces, configure stops and incentives for the link up, communicate with others on a link up, configure settings (e.g., profile and privacy), etc. The interface circuit 116 can further generate navigation interfaces of real-time data (or delayed data from near real-time or periodic data receival) associated with location of the client device 110 and other devices, current geographic location, a proposed route or current route (e.g., proposed route that was accepted), one or more stops on the current route, any changes to the link up.

In another example implementation, the application 112 executed by the client device 110 can cause an application to the display the interfaces on the client device 110. For example, the user may open or access (e.g., via the network 120) a mobile application stored on the client device 110 structured to host the interfaces. In various implementations, interface can include infrastructure such as, but not limited to, host devices (e.g., computing device) and a collection of files defining the interface and stored on the host devices (e.g., in database 140). The mobile application operates by receiving a selection of the application (e.g., icon) on the viewport of the client device 110. In response, the interface circuit 116 executing the interface in the mobile application may request data such as from content (e.g., link up information, settings, current link ups, public link ups, previous link ups, future link ups, privacy settings, other interfaces, etc.) from database 140. The mobile application may include other functionalities, such as navigational controls (e.g., backward and forward buttons, home buttons). In some implementations, the interface circuit 116 can include both a client-side interface and a server-side interface. For example, a client-side interface can be written in one or more general purpose programming and can be executed by client device 110. The server-side interface can be written, for example, in one or more general purpose programming languages and can be executed by the linking system 130. Additional details of the interface are described in detail with reference to FIGS. 4-5.

Interface circuit 116 may detect events within application 112. In various implementations, interface circuit 116 may be configured to trigger other functionality based on detecting specific events (e.g., link up request acceptance, in-app purchases, configuring privacy settings, opening the application for the first time, spending a certain amount of time interacting with an application, selecting a public link up, etc.). For example, interface circuit 116 may trigger a pop-up window (overlayed on an interface) upon selecting an actionable object (e.g., button, drop-down, input field, etc.) within an interface. In various implementations, library 114 includes a function that is embedded in application 112 to trigger interface circuit 116. For example, a user may include a function of library 114 in a transaction confirmation functionality of application 112 that causes interface circuit 116 to track and transmit the location of the user device to the linking system 130. It should be understood that events may include any action for a user within an application and are not limited to the examples expressly contemplated herein. In various implementations, interface circuit 116 is configured to differentiate between different types of events. For example, interface circuit 116 may trigger a first set of actions based on a first type of detected event (e.g., selecting a link up icon) and may trigger a second set of actions based on a second type of detected event (e.g., completion of a link up). In various implementations, interface circuit 116 is configured to collect event logs associated with the detected event and/or events and transmit the collected event logs to link up circuit 135.

In various implementations, the interface circuit 116 can collect events logs based on a designated session. In one example, the designated session may be active from when application 112 is opened/selected to when application 112 is closed/exited. In another example, the designated session may be active based on a user requesting a session to start and a session to end. Each session, the interface circuit 116 can collect event logs while the session is active. Once completed, the event logs may be provided to any system described herein. During the session, the event logs may trace each event in the session such that the events are organized in ascending and/or descending order. In some implementations, the events may be organized utilizing various other techniques (e.g., by event type, by timestamp, by malfunctions, etc.).

In various implementations, the interface circuit 116 of the client device 110 (or third party device 150) may start collecting event logs when application 112 is opened (e.g., selected by the user via an input/output device 118 of the client device 110), thus starting a session. In some implementations, once the application is closed by the user the interface circuit 116 may stop collecting event logs, thus ending the session. In various implementations, the user may force clear event logs or force reset application 112 such that the current session may reset, thus ending a particular session and starting a new session. Additional details regarding the interface circuit 116 functionalities, and the interfaces presented within a viewport of client device 110 are described in additional details with reference to FIGS. 4-5.

The input/output circuit 118 is structured to send and receive communications over network 120 (e.g., with linking system 130 and/or other client devices 110). The input/output circuit 118 is structured to exchange data (e.g., environmental data, activity data, interface information, interactions), communications, instructions, etc. with an input/output component of the linking system 130, other client devices, and/or data sources 160. In one implementation, the input/output circuit 118 includes communication circuitry for facilitating the exchange of data, values, messages, and the like between the input/output circuit 118 and the linking system 130. In yet another implementation, the input/output circuit 118 includes machine-readable media for facilitating the exchange of information between the client device 110 and the linking system 130. In yet another embodiment, the input/output circuit 118 includes any combination of hardware components, communication circuitry, and machine-readable media.

In some embodiments, the input/output circuit 118 includes suitable input/output ports and/or uses an interconnect bus (not shown) for interconnection with a local display (e.g., a touchscreen display) and/or keyboard/mouse devices (when applicable), or the like, serving as a local user interface for programming and/or data entry, retrieval, or other user interaction purposes. As such, the input/output circuit 118 may provide an interface for the user to interact with various applications (e.g., application 112) stored on the client device 110. For example, the input/output circuit 118 includes a keyboard, a keypad, a mouse, joystick, a touch screen, a microphone, a haptic sensor, a car sensor, an IoT sensor, a biometric sensor, an accelerometer sensor, a virtual reality headset, smart glasses, smart headsets, and the like. As another example, input/output circuit 118, may include, but is not limited to, a television monitor, a computer monitor, a printer, a facsimile, a speaker, and so on. As used herein, virtual reality, augmented reality, and mixed reality may each be used interchangeably yet refer to any kind of extended reality, including virtual reality, augmented reality, and mixed reality.

In some implementations, input/output circuit 118 of the client device 110 can receive user input from a user (e.g., via sensors, or any other input/output devices/ports described herein). A user input can be a plurality of inputs, including by not limited to, a gesture (e.g., a flick of client device 110, a shake of client device 110, a user-defined custom gesture (e.g., utilizing an API), biological data (e.g., stress level, heart rate, hand geometry, facial geometry, psyche, and so on) and/or behavioral data (e.g., haptic feedback, gesture, speech pattern, movement pattern (e.g., hand, food, arm, facial, iris, and so on), or combination thereof, etc. In some embodiments, one or more user inputs can be utilized to perform various actions on client device 110. For example, a user that performs a gesture may invoke a link up request or end a link up session (e.g., indicating completion or indicating cancelation.

Input/output circuit 118 may exchange and transmit data information, via network 120, to all the devices described herein. In various implementations, input/output circuit 118 transmits data via network 120. Input/output circuit 118 may confirm the transmission of data. For example, input/output circuit 118 may transmit requests and/or information to linking system 130 based on selecting one or more selectable (or actionable) items within the interfaces described herein. In another example, input/output circuit 118 may transmit requests and/or information to another client device operated by another user (e.g., another invitee, inviter). In various implementations, input/output circuit 118 can transmit data periodically. For example, input/output circuit 118 may transmit data at a predefined time. As another example, input/output circuit 118 may transmit data on an interval (e.g., every 10 seconds, every ten minutes, every ten hours, etc.).

Linking system 130 may receive event logs from library 114 and facilitate performing analysis on received data to generate information. For example, linking system 130 may receive a data bundle including event logs from library 114 and securely correlate the received data with data stored in database 140 to generate information. In this example, the data bundle may include one or more enrollment datasets and one or more data sharing levels of the enrolled mobile devices of the one or more enrollment datasets. Alternatively, or in combination, in this example, the data bundle may include one or more invitees to a link up request and one or more data sharing levels of the invitees and/or inviter of the link up request. As another example, linking system 130 may receive first data associated with positions and real-time (or near real-time) information of the invitees and inviter of an on-going or pending link up from library 114 and second data associated with metadata of the link up request including a link up location, and data sharing levels, and correlate the first and second data.

In various embodiments, linking system 130 generates aggregate information. For example, linking system 130 may determine how many users arrived at the link up location after interacting with the mobile application and accepting the link up request. The aggregate information may describe a number or grouping of link up requests (e.g., scheduled or pending link up requests). Additionally, or alternatively, the aggregate information may describe an individual link up request interaction (e.g., experience of the user during the link up including, but not limited to, traffic the user experienced, the route the user took, if the user made an intermediate stop, when the user arrived, current location of the user, etc.). Aggregate information may include a unique identifier. In some implementations, the identifier identifies a link up request. In some implementations, the aggregate information describes one or more interactions associated with a link up request. For example, aggregate information may include a time, date, and/or link up location of the link up request. The link up request described by an anonymous link up data (e.g., where the invitee does not share their information with anyone else on the link up request) may include when the link up was accepted, how long it took for the user to accept the link up upon receiving a notification, if the user selected an intermediate stop, other navigation performed in the mobile application (e.g., selecting/clicking a selectable element, hovering over a selectable element, and/or other interactions with a selectable element).

Linking system 130 may be a server, distributed processing cluster, cloud processing system, or any other computing device. Linking system 130 may include or execute at least one computer program or at least one script. In some implementations, linking system 130 includes combinations of software and hardware, such as one or more processors configured to execute one or more scripts.

Linking system 130 is shown to include database 140 and data processing circuit 132. Database 140 may store received data. For example, database 140 may store, but is not limited to, link up request information including ongoing real-time information (e.g., current location of users, or near real-time location of the user, or previous recorded location of the user), scheduled or pending link up information, metadata of one or more link up requests, sharing levels, predetermined link ups and public link ups, link up marketplace code bundles, software development kits (SDKs) and application programming interfaces (APIs), graphical user interface code bundles (e.g., to implement the mobile application). In some implementations, database 140 stores identifiers. For example, database 140 may store logs (e.g., event logs of previous, current, and future link ups) and supplemental data sharing an intermediary identifier. The identifier may be used later for correlation of anonymous link up data. Database 140 may include one or more storage mediums. The storage mediums may include but are not limited to magnetic storage, optical storage, flash storage, and/or RAM. Linking system 130 may implement or facilitate various APIs to perform database functions (i.e., managing data stored in database 140). The APIs can be but are not limited to SQL, ODBC, JDBC, NOSQL and/or any other data storage and manipulation API.

Data processing circuit 132 includes processor 133 and memory 134. Memory 134 may have instructions stored thereon that, when executed by processor 133, cause data processing circuit 132 to perform the various operations described herein. The operations described herein may be implemented using software, hardware, or a combination thereof. Processor 133 may include a microprocessor, ASIC, FPGA, etc., or combinations thereof. In many implementations, processor 133 may be a multi-core processor or an array of processors. Memory 134 may include, but is not limited to, electronic, optical, magnetic, or any other storage devices capable of providing processor 133 with program instructions. Memory 134 may include a floppy disk, CD-ROM, DVD, magnetic disk, memory chip, ROM, RAM, EEPROM, EPROM, flash memory, optical media, or any other suitable memory from which processor 133 can read instructions. The instructions may include code from any suitable computer programming language such as, but not limited to, C, C++, C#, Java, JavaScript, Perl, HTML, XML, Python and Visual Basic.

Memory 134 may include link up circuit 135. In broad view, the link up circuit 135 may receive data and produce information regarding the data. In some implementations, the link up circuit 135 can receive a link up request (e.g., from an inviter device) and provide the link up request to each of a plurality of invitee devices. For example, a user of library 114*b* may register a user account with a client device such that the client device can execute the library 114*b* and execute link up requests. Registering a client device can include, but not limited to, providing various identifying information (e.g., device name, geolocation, identifier, etc.), platform designations (e.g., iOS, Android, WebOS, Black- Berry OS, etc.), user actions (e.g., activation gesture, haptic, biometric, etc.), authentication information (e.g., username, password, two-step criteria, security questions, address information, etc.). Once the link up circuit 135 approves or receives a registration request, the information associated with the request may be stored in database 140. Additionally, a notification may be transmitted to the client device indicating the client device is registered and can utilize link up features associated with one or more applications.

In some implementations, the link up circuit 135 can facilitate and manage link up requests including, but not limited to, communicating with the inviter and invitees of the link up, accessing the client devices of the inviter and invitees for real-time (or near real-time) information, modify a link up for one or more of the inviter or invitees (e.g., add an intermediate stop), control data sharing based on data sharing levels set by the inviter and invitees, determine unprotected and protected data and control access to the protected data, scheduling link ups, accessing social media data and other third-party data to schedule link ups and update ongoing or pending link ups, providing the graphical user interfaces of applications, determining and generating routes, and any other information used prior to, during, or after a link up.

In various implementations, link up circuit 135 performs statistical operations on received data to produce statistical measurements describing the received data. For example, link up circuit 135 may determine acceptance and promptness (e.g., if they arrive on time and at the right location) of invitees and inviters associated with a link up request. In some implementations, link up circuit 135 generates demographic information (e.g., user distributions, etc.), geographic results (e.g., location distributions, etc.), and/or audiences (e.g., a target group of users based on one or more parameters, for example users who purchased more than a threshold amount, etc.). For example, for a public link up (e.g., football tailgate, concert, any other event) the generated demographic information can be used to determine who should be invited to the public link up. In some implementations, link up circuit 135 correlates link up logs with supplemental data. For example, link up circuit 135 may correlate link up logs associated with a link up with supplemental data associated with a social media data using an intermediate identifier to determine potential upcoming link ups with potential invitees. In various implementations, link up circuit 135 generates information. The information may include link up metadata, data describing an operation of application 112, interactions of invitees with application 112, and/or the like.

In addition, the statistical operations performed by the link up circuit 135 can produce usage metrics of client devices (e.g., client device 110) and library 114. Some usage metrics can include, but are not limited to, device registration metrics, feedback metrics (e.g., what percentage of users submitted feedback), content network testing metrics (e.g., what percentage of users performed a link up, etc. The statistical operations performed by the link up circuit 135 can also produce impact metrics of client devices (e.g., client device 110) and library 114. Some impact metrics can include, but are not limited to, acceptance rate of a link up request specific to an inviter or invitee, popular or common link up locations, popular or common intermediate stops, acceptance and cancelation prior to completion rate, completion rate of a link up request specific to an inviter or invitee, etc.

In various implementations, the usage metrics and impacts metrics can be calculated based on performing various statistical operations and analysis. The usage metrics and impacts metrics can further be prioritized based on various factors (e.g., geographic area, inviter, language preference, new or existing users, and so on). In some implementations, received data and previously collected data stored in database 140 (e.g., link up logs, previous, current, pending and schedule link ups) can be used to train a machine-learning model. That is, predictions regarding link up locations, intermediate stops, and link up invitees could be based on artificial intelligence (AI) or a machine-learning model (MLM). For example, a first MLM may be trained to identify particular link up locations within a particular geographic area and output a prediction. In this example, a second MLM may be trained to identify invitees based on previous link ups. In various implementations, machine learning algorithms can include, but are not limited to, a neural network, convolutional neural network, recurrent neural network, linear regression model, and sparse vector machine). The various computing systems/devices described herein can input various data (e.g., event logs, debugging information and so on) into the machine learning model, and receive an output from the model indicating a particular action to perform.

The data sources 160 can provide data to the linking system 130. In some arrangements, the data sources 160 can be structured to collect data from other devices on network 120 (e.g., client devices 110a and 110b) and relay the collected data to the linking system 130. In one example, a user and/or entity may have a server and database (e.g., proxy, enterprise resource planning (ERP) system) that stores link up information associated with the user and/or entity (e.g., historical information, default information, social media information including pictures and locations of the user, public link up information). In this example, the linking system 130 may request data associated with specific data stored in the data source (e.g., data sources 160) of the user or entity. For example, in some implementations, the data sources 160 can host or otherwise support a search or discovery engine for Internet-connected devices. The search or discovery engine may provide data, via the data acquisition engine 180, to the linking system 130. In some implementations, the data sources 160 can be scanned to provide additional data. The additional data can include newsfeed data (e.g., articles, breaking news, and television content), social media data (e.g., Facebook, Twitter, Snapchat, and TikTok), geolocation data of users on the Internet (e.g., GPS, triangulation, and IP addresses), governmental databases (e.g., FBI databases, CIA databases, COVID-19 databases, No Fly List databases, terrorist databases, vulnerability database, cyber threat intelligence databases, and certificate databases), and/or any other data associated with the user and link up request.

The system 100 can include a data acquisition engine 180. In various implementations, the linking system 130 can be communicatively and operatively coupled to the linking system 130. The linking system 130 can include one or more processing circuits configured to execute various instructions. In various implementations, the linking system 130 can be configured to facilitate communication (e.g., via network 120) between the linking system 130 and systems described herein. The facilitation of communication can be implemented as an application programming interface (API) (e.g., REST API, Web API, customized API), batch files, and/or queries. In various implementations, the data acquisition engine 180 can also be configured to control access to resources of the linking system 130 and database 140.

The API can be used by the data acquisition engine 180 and/or computing systems to exchange data and make function calls in a structured format. The API may be configured to specify an appropriate communication protocol using a suitable electronic data interchange (EDI) standard or technology. The EDI standard (e.g., messaging standard and/or supporting technology) may include any of a SQL data set, a protocol buffer message stream, an instantiated class implemented in a suitable object-oriented programming language (e.g., Java, Ruby, C#), an XML file, a text file, an Excel file, a web service message in a suitable web service message format (e.g., representational state transfer (REST), simple object access protocol (SOAP), web service definition language (WSDL), JavaScript object notation (JSON), XML remote procedure call (XML RPC)). As such, EDI messages may be implemented in any of the above or using another suitable technology.

In some implementations, data is exchanged by components of the data acquisition engine 180 using web services. Where data is exchanged using an API configured to exchange web service messages, some or all components of the computing environment may include or may be associated with (e.g., as a client device) one or more web service node(s). The web service may be identifiable using a unique network address, such as an IP address, and/or a URL. Some or all components of the computing environment may include circuits structured to access and exchange data using one or more remote procedure call protocols, such as Java remote method invocation (RMI), Windows distributed component object model (DCOM). The web service node(s) may include a web service library including callable code functions. The callable code functions may be structured according to a predefined format, which may include a service name (interface name), an operation name (e.g., read, write, initialize a class), operation input parameters and data type, operation return values and data type, service message format, etc. In some implementations, the callable code functions may include an API structured to access on-demand and/or receive a data feed from a search or discovery engine for Internet-connected devices. Further examples of callable code functions are provided further herein as embodied in various components of the data acquisition engine 180.

The data sources 160 can provide data to the linking system 130 based on the data acquisition engine 180 scanning the Internet (e.g., various data sources and/or data feeds) for data associated with a user or link up request. That is, the data acquisition engine 180 can hold (e.g., in non-transitory memory, in cache memory, and/or in database 140) the executables for performing the scanning activities on the data sources 160. Further, the linking system 130 can initiate the scanning operations. For example, the linking system 130 can initiate the scanning operations by retrieving domain identifiers or other user/entity identifiers from a computer-implemented DBMS or queue. In various implementations, the data sources 160 can facilitate the communication of data between the client devices 110 (e.g., 110*a* and 110*b*), such that the data sources 160 receive data (e.g., over network 120) from the client devices 110*a* and client device 110*b* before sending the data other systems described herein (e.g., linking system 130). In other implementations and as described herein, the client devices 110, and the data sources 160 can send data directly, over the network 120, to any system described herein and the data sources 160 may provide information not provided by any of the client devices 110.

Figure 2:
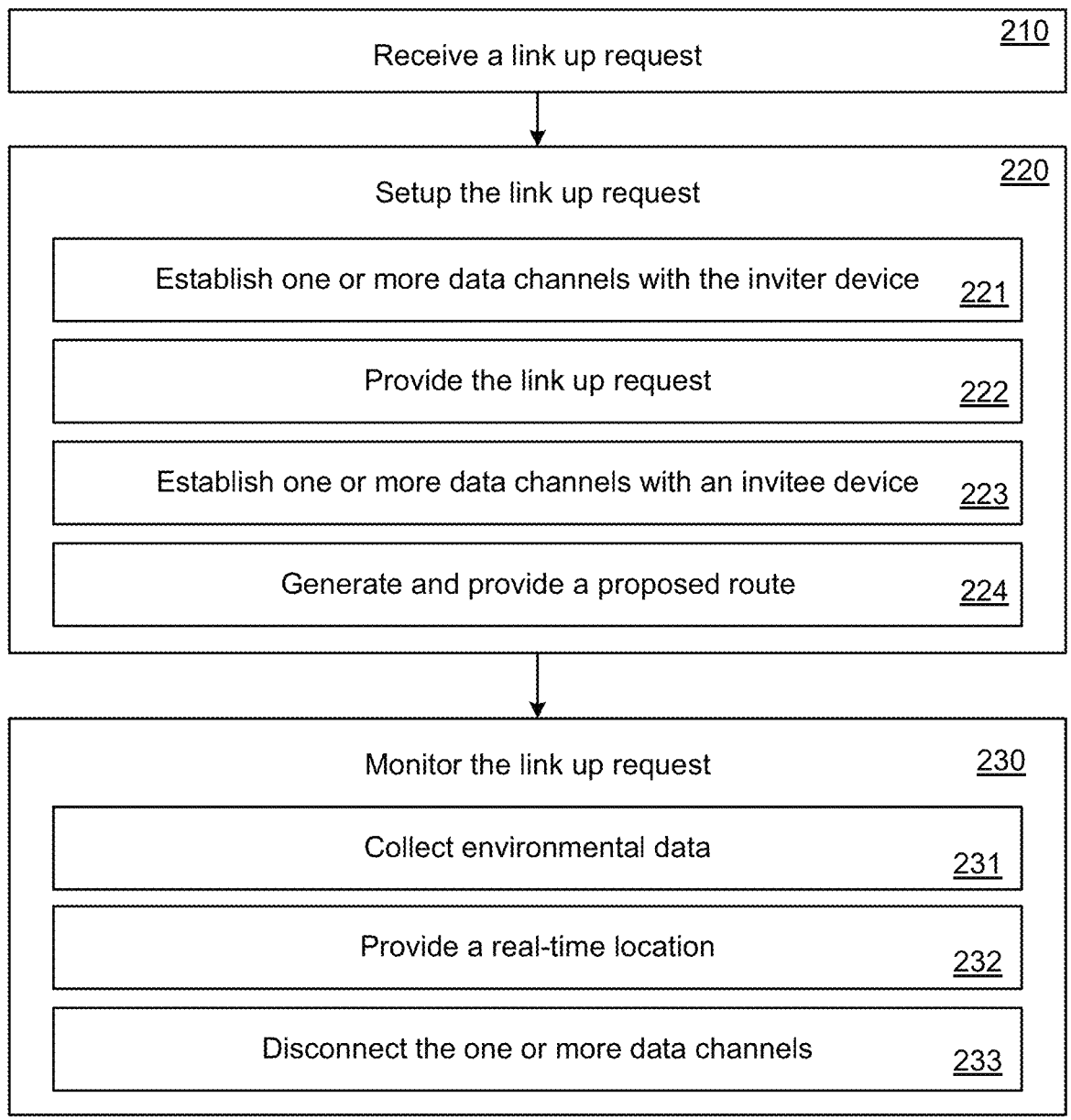
FIG. 2 is a flowchart for a computer-implemented method for linking devices and protecting data, according to some embodiments.

Referring now to FIG. 2, a flowchart for a method 200 for linking devices and protecting data is shown, according to some embodiments. Linking system 130 can be configured to perform method 200. Further, any computing device described herein can be configured to perform method 200.

In broad overview of method 200, at block 210, the one or more processing circuits (e.g., linking system 130 in FIG. 1) can receive a link up request 210. At block 220, the one or more processing circuits can setup the link up request. At block 230, the one or more processing circuits can monitor the link up request. Additional, fewer, or different operations may be performed depending on the particular arrangement. In some embodiments, some, or all operations of method 200 may be performed by one or more processors executing on one or more computing devices, systems, or servers. In various embodiments, each operation may be re-ordered, added, removed, or repeated.

At block 210, the one or more processing circuits can receive, from an inviter device, a link up request associated with a link up location. The inviter device can be the facilitator the link up and the link up request can include metadata of the link up request including invitee information, potential intermediation stops, the link up location, and various other data of the link up. In some implementations, the link up request is associated with a predetermined link up with predetermined invitee devices. Furthermore, the one or more processing circuits can determine the predetermined link up based on social media data, wherein the predetermined link up is determined based on identifying trends in the social media data. For example, a preconfigured link up can be established based on a group of individuals meeting up the first Friday of the month at the arcade (e.g., shown in posts on a social media website). In another example, a link up request can be tailored for educational groups aiming to organize study sessions at local libraries, using social media platforms to coordinate times and locations. In some implementations, the one or more processing circuits can receive (e.g., from the inviter device) a list of items associated with the link up request. In some implementations, the link up request is a public link up request configured to share the link up request to a link up marketplace. For example, a public link up in the community can be established by an event center or location (e.g., football game, movie theater, political rally, etc.) such that a link up request can be shared in a link up marketplace or online. In particular, the link up marketplace can be another application (online or mobile) configured to provide public or private link ups to user accounts or un-registered users and allow the users to select one or more link ups. For example, a user might discover a local art exhibit link up through the marketplace, enabling a more engaging cultural experience.

In some implementations, public link ups can be created and shared through a link up marketplace, allowing users to discover and participate in various events such as football games, movie theaters, or political rallies. For example, a local community center might post an open invitation for a volunteer cleanup event at a nearby park. To enhance the user experience, the system can intelligently identify sub-groups of link up participants within the public event, enabling users to connect and interact with people they know or have shared interests with, such as friends or acquaintances. For example, at a public link up for a tailgating party, the system can analyze the participants' data, such as their social connections, previous link ups, and interests, to identify potential sub-groups. In another example, a concert link up might use attendees' music preferences to suggest meet-ups with fans of similar genres.

This information can be used to create a more personalized experience by suggesting a smaller gathering within the larger public event, where users can engage with familiar faces or those with similar preferences. The link up marketplace can be integrated into another application, either online or mobile, that offers both public and private link ups to registered users and unregistered guests. For example, an app dedicated to local community engagement might incorporate the link up marketplace feature, encouraging residents to participate in a variety of activities and events tailored to their interests and social circles. Users can browse and select from various link ups, further customizing their experiences to suit their preferences and comfort levels. This approach facilitates more meaningful and enjoyable interactions at public events while also preserving user privacy and autonomy.

At block 220, the one or more processing circuits can setup the link up request. Setup of the link up request can include establishing one or more data channels with the inviter device (block 221), providing the link up request (block 222), establishing one or more data channels with an invitee device (block 223), and generating and providing a proposed route (block 224). At block 221, the one or more processing circuits can establish one or more data channels with the inviter device. For example, the one or more processing circuits can establish a secure wireless connection with the inviter device, ensuring a reliable communication channel for transmitting the link up details. Each data channel may include a network connection (e.g., wired, wireless, cloud) between the one or more processing circuits and the linking system 130. In general, each data channel of the plurality of data channels may be communicatively connected to the one or more processors via a data channel communication network such that each device or system connected to the data channel can be a computing device that can store, generate, and collect data.

At block 222, the one or more processing circuits can provide the link up request to each of a plurality of invitee devices, the link up request including the link up location. In some implementations, the one or more processing circuits can determine one or more stops within a geographic area of the link up request that includes one or more of the list of items in stock. For example, the link up circuit 135 can analyze data source 160 (e.g., local grocery stores and online). In some implementations, each invitee and inviter can be associated with a user account (sometimes referred to as a "profile") of the application. For example, the first invitee device can be associated with a profile of the application, and wherein the first proposed route is based on a default location of the profile. In another example, a proposed route may consider historical traffic data and current road conditions to optimize travel time for each invitee.

At block 223, the one or more processing circuits can, in response to receiving a first acceptance of the link up request from a first invitee device of the plurality of invitee devices, establish the one or more data channels with the first invitee device. For example, the processing circuits may use Bluetooth or Wi-Fi Direct to establish a secure connection for sharing link up details and updates in real-time. In some implementations, in response to receiving the first acceptance, the one or more processing circuits can offer the one or more stops as selectable elements via the first GUI of the application, wherein determining the stop and providing the intermediate location are in response to receiving a selection of one of the selectable elements. For example, a stop at a local café that offers a discount for participants of the link up might be proposed, enhancing the overall experience and providing a relaxed setting for participants to meet before the main event. Furthermore, the one or more processing circuits can update the list of items indicating at least one item of the list of items is attributed to the first inviter device. Additionally, each of the one or more stops offered further include an incentive (e.g., configured by the inviter or set by the one or more processing circuits) presented with a selectable element of the selectable elements (e.g., offer best seat at the game, offer first selection of one or more food items, offer a better parking spot, offer a free or food item drink associated with the link up location, etc.). For example, a special access code for a VIP area at a concert could be offered as an incentive for participants who choose to meet at a pre-determined promotional event spot.

At block 224, the one or more processing circuits can generate and provide, to the first invitee device via a first graphical user interface (GUI) of an application, a first proposed route to the link up location and at least one first real-time location of one of the plurality of invitee devices or the inviter device, wherein the first proposed route is based on a first geographic location of the first invitee device. For example, the processing circuits might dynamically update the route in real-time to avoid traffic congestion, ensuring the fastest possible arrival time. In some implementations, the one or more processing circuits can generate and present, to the second invitee device via a second GUI of the application, a second proposed route to the link up location, wherein the second proposed route is based on a second geographic location of the second invitee device. For example, the application could suggest a scenic route for the second invitee device, offering an enjoyable journey if time allows.

In some implementations, the first proposed route is presented on the first invitee device, and wherein the presentation includes an estimated time of arrival (ETA) for each of the inviter device, the first invitee device, and the second invitee device. For example, everyone or certain client devices that accepted the link up request can be provided the ETA of each other. In another example, adjustments can be made for those arriving by different modes of transport, such as public transit routes for those without cars. In some implementations, the one or more processing circuits can update the one or more stops based on either the first proposed route or the second proposed route. In some implementations, for a public link up, the one or more processing circuits can generate and provide, via the application, the link up request to a plurality of public invitee devices, the link up request including the link up location, wherein the plurality of public invitee devices are determined based on an enrollment dataset. In particular, the enrollment dataset can be determined from data sources 160 or provided by the inviter (e.g., customer list). For example, the link up request for a large-scale community clean-up event could be broadcast to local residents who have previously participated in similar events, encouraging a larger turnout and fostering community engagement.

In some implementations, the first acceptance includes privacy parameters for sharing data of the first invitee device, and wherein the privacy parameters include a plurality of data sharing levels associated with a type and amount of the data shared. For example, users can be allowed to set their individual privacy settings. In some implementations, the one or more processing circuits can allow the inviter or invitees to set their individual privacy settings based on a plurality of levels related to who can see the data. For example, a first level of the plurality of data sharing levels configures the one or more processors to share the data of the first invitee device with at most the inviter device, and a second level of the plurality of data sharing levels configures the one or more processors to share the data of the first invitee device with at most the inviter device and one of the plurality of invitee devices, and a third level of the plurality of data sharing levels configures the one or more processors to share the data of the first invitee device with the inviter device and one of the plurality of invitee devices. Specifically, the third level allows for sharing of both location and contact information only with those directly involved in the meetup.

In another example, a first level of the plurality of data sharing levels configures the one or more processors to share unprotected data of the data of the first invitee device with at most the inviter device, and a second level of the plurality of data sharing levels configures the one or more processors to share the unprotected data of the data of the first invitee device with the inviter device and one of the plurality of invitee devices, and a third level of the plurality of data sharing levels configures the one or more processors to share the unprotected data and protected data of the data of the first invitee device with the inviter device and one of the plurality of invitee devices. That is, the processing circuits can enable users to fine-tune their privacy preferences, allowing for a mix of public and private data sharing depending on the user's comfort level with each participant. For example, users can choose to share their live location with close friends while only sharing their estimated time of arrival with acquaintances.

In some implementations, the system enables the invitee to opt-in and have greater control over their privacy by allowing them to choose from various privacy parameters for each link up session. For example, an invitee can select to share their precise location only with friends while attending a large music festival, enhancing safety without compromising privacy. In one aspect, the system allows the invitee to customize the sharing of protected and unprotected data based on the nature of the link up session. In another example, a user attending a professional networking event can opt to share their business contact information but keep their personal phone number private. This enables users to differentiate between trusted link ups, such as those with familiar participants, and untrusted link ups, like public events where users may prefer to maintain a higher level of privacy. For example, during a trusted link up, an invitee may feel comfortable sharing both protected and unprotected data, knowing that the other participants are people they have interacted with before. On the other hand, in an untrusted or public event, the invitee may opt for more restrictive settings, like sharing only unprotected data or choosing to be completely incognito. For example, someone attending a large convention might share their location with all attendees in the official app but choose to be invisible on the broader social media feed. The ability to customize privacy parameters for each session empowers users to maintain control over their data, ensuring that their privacy preferences are respected across different types of link up events.

At block 230, the one or more processing circuits can monitor the link up request. Monitoring the link up request can include collecting environmental data (block 231), providing a real-time location (block 232), and disconnecting the one or more data channels (block 233). At block 231, the one or more processing circuits can collect (e.g., continuously, at designated times, or during a time period), via the one or more data channels, environmental data of the inviter device and the plurality of invitee devices. The environmental data can include device data such as, but not limited to, current location of the device, interactions with the device, information of the link up location, cancelation or completion of the link up, etc. In some implementations, the one or more processing circuits can determine a stop along the first proposed route or the second proposed route and provide an intermediate location to at least one of the first invitee device or the second invitee device. For example, the one or more processing circuits can establish stops for individuals of the link up request to stop at prior to arriving at the link up (e.g., inviter forgot to bring ketchup to the tailgate).

At block 232, the one or more processing circuits can provide, to the inviter device via a third GUI of the application, a real-time location (or near real-time, delayed location based on delayed data) of the first invitee device and the second invitee device based on the environmental data, wherein the real-time location of the first invitee device and the second invitee device is presented on the third GUI of the application. For example, the processing circuits can highlight the paths of each participant as they converge on the meetup location, offering the inviter a visual representation of all arriving parties. In another example, the processing circuits might alert the inviter when an invitee is within a certain distance of the link up location, allowing for better timing of activities. In yet another example, the processing circuits can provide updates on the invitee's ETA adjustments due to traffic conditions, keeping the inviter informed in real-time.

At block 233, the one or more processing circuits can, in response to determining at least one of the first invitee device or the second invitee device completed the link up request at the link up location, disconnect the one or more data channels connecting the one or more processors and the at least one of the first invitee device or the second invitee device. In some implementations, the one or more processing circuits can in response to determining at least one of the first invitee device or the second invitee device arrived at the link up location, share a geographic location of the inviter device to the at least one of the first invitee device or the second invitee device. For example, the inviter (or the invitee) can share a pinned location after arrival, such as in a large parking lot. In some implementations, upon confirmation of an invitee's arrival, the processing circuits could enable a feature for the inviter to send a welcome message or instructions on where exactly inside the location they can meet, further facilitating a smooth link up process. For example, this could be particularly used in crowded events where finding each other could be challenging, and sharing a specific meeting point could significantly enhance the experience.

In some implementations, when the processing circuits determines that at least one of the invitee devices has arrived at the link up location, it enables a feature for users to privately message or notify other invitees or the inviter of their presence. In various implementations, the private messaging feature can be enabled for the entirety of the link up. This can be particularly helpful in scenarios where participants are gathered in large or crowded areas, such as big parking lots, concerts, or festivals. Upon arrival at the link up location, the invitee can choose to share their precise geographic location, such as a pinned location on a map, with the inviter and other attendees. This sharing of location data can be done through private messages or notifications, allowing participants to easily locate one another without broadcasting their whereabouts to the entire group or event. Additionally, once the link up request is complete, the system can automatically disconnect the data channels connecting the invitee devices and the processing circuits. This ensures that the users' location information is shared when necessary, preserving their privacy and minimizing potential security risks.

In some implementations, the processing circuits can employ a "home safe" feature that can alert parents, guardians, or significant others if their child (or another user) is not following the link up location route back home (or a location returning form the link up location). For example, if a child deviates from the prescribed route after a school event, the system could send an alert to the parent's device. This can allow the parents, guardians, or significant other to check on the user and receive assurance. That is, the feature could offer real-time tracking options so guardians can see the child's current location. For example, the processing circuits can send a notification if the child's device stops moving for a certain period or if it detects an unusual pattern of movement.

In some implementations, during the setup of the link up request at block 220, the processing circuits can determine and suggest a central location of a link up based on geographic locations of all or some of the participants. For example, if the participants are evenly spread across a city, the system might suggest a popular central café that is equidistant (or substantially equidistant) for all attendees, maximizing convenience and reducing travel time. In another example, if the link-up involves an outdoor activity preference among participants, the system could suggest a well-rated park located centrally to everyone's locations. In some implementations, the processing circuits can determine and suggest the central location based on real-time traffic data and participants' current locations to ensure the most efficient routes for all. For example, a central museum that not only serves as a convenient meeting point but also offers an engaging activity for the group. In some implementations, the central location can be based on specific characteristics or profiles of the participants, such as a preference for vegan restaurants or interest in art galleries, ensuring the suggested location aligns with the group's interests.

In some implementations, the application presenting the GUI provided by the processing circuits can further include links to other applications. That is, during a link up the GUI can present audio book applications, music applications, podcast applications, and so on to allow the link up participants to receive similar audio or content (e.g., music from a particular band or artist if going to a music festival with the particular band or artist) or the same audio or content (e.g., the same podcast about planning a wedding when the link up participants are meeting at a wedding planning conference). That is, the GUI can facilitate seamless switching between different audio sources, depending on individual preferences or group consensus. For example, as users approach the location of a book festival (e.g., at block 231, collecting environmental data), the processing circuits can suggest starting a popular author's latest audiobook. In another example, the GUI could display a notification when a significant portion of the group starts playing a pre-game hype playlist, prompting others to join in. In some arrangements, the processing circuits can provide recommended playlists or audiobook chapters that will conclude right (or closely around) as the participants arrive at the link-up location. For example, a playlist with a duration matching the estimated travel time might be automatically generated. Additionally, one or more link-up participants can share a favorite podcast episode, initiating simultaneous playback across devices. For example, one participant might push a "share and play" button so that all participants begin listening to the same podcast at the same point. In another example, a link-up member might share a curated playlist that dynamically updates based on the group's progress towards the destination. Additionally, other individuals can receive real-time updates of the progress of other participants of the audio being listened to, such as a live indicator of which song from a shared playlist is currently playing. For example, the GUI could show that most participants are listening to the third chapter of a shared audiobook, allowing others to sync their playback.

In some implementations, the processing circuits the first GUI and second GUI can include to a look and feel (LF) theme based on the link up request or the link up location. For example, the GUI themes could automatically adjust to feature pumpkins and ghost motifs, creating a festive user interface for Halloween-themed link ups. In some implementations, the link up request provided to the plurality of invitee devices can include a customized invitation including content corresponding with the link up request or link up location. For example, the customized invitation could be adorned with floral designs and elegant script fonts, suitable for a wedding-themed gathering.

In some implementations, the first location of one of the plurality of invitee devices or the inviter device can be a first visual indicator when the one of the plurality of invitee devices or the inviter device is location sharing and the first location of one of the plurality of invitee devices or the inviter device can be a second visual indicator when the one of the plurality of invitee devices or the inviter device is not location sharing. For example, the first visual indicator could be a vibrant pink when location sharing is active to signify presence, and turn to a subtle gray when location sharing is turned off, indicating privacy.

In some implementations, in response to receiving the first acceptance, the processing circuits can activate one or more safety features on the first invitee device, wherein the one or more safety features include enabling a third-party device to track the first invitee device and establishing another data channel between the third-party device and the first invitee device to exchange communicates or messages. For example, a home safe feature could allow a designated contact, such as a family member, to monitor the user's journey back home after the event, enhancing safety and peace of mind.

In some implementations, the received link up location is a general location, the processing circuits can in response to receiving the first acceptance of the link up request, determine a central location for the link up location based on the first geographic location of the first invitee device and a geographic location of the inviter device, wherein the first proposed route to the link up location is to the central location. For example, central link up locations based on users' individual locations could involve calculating a midpoint that minimizes overall travel time for all participants, facilitating a convenient meeting place.

In some implementations, generating and providing, via the first GUI of the application, the first proposed route to the link up location includes at least one of (1) a first selectable element including a request a rideshare or carpool for the link up, (2) a second selectable element including an offer for pick up by the inviter device or the plurality of invitee devices, or (3) a third selectable element including a media recommendation the first invitee device can output as audio during the first proposed route to the link up location. For example, the first selectable element can include options to select a rideshare service based on the quickest arrival time or the most cost-effective option. For example, the second selectable element can offer coordination of a pick-up schedule among the invitees, optimizing the route to pick up each person based on their location. For example, the third selectable element can suggest playlists or podcasts that are popular or trending within the group's shared interests. In another example, the third selectable element can curate a playlist of music relevant to the theme of the link up or select a podcast episode matched with the estimated time to the destination, ensuring entertainment is perfectly timed for the journey's duration.

Figure 3:
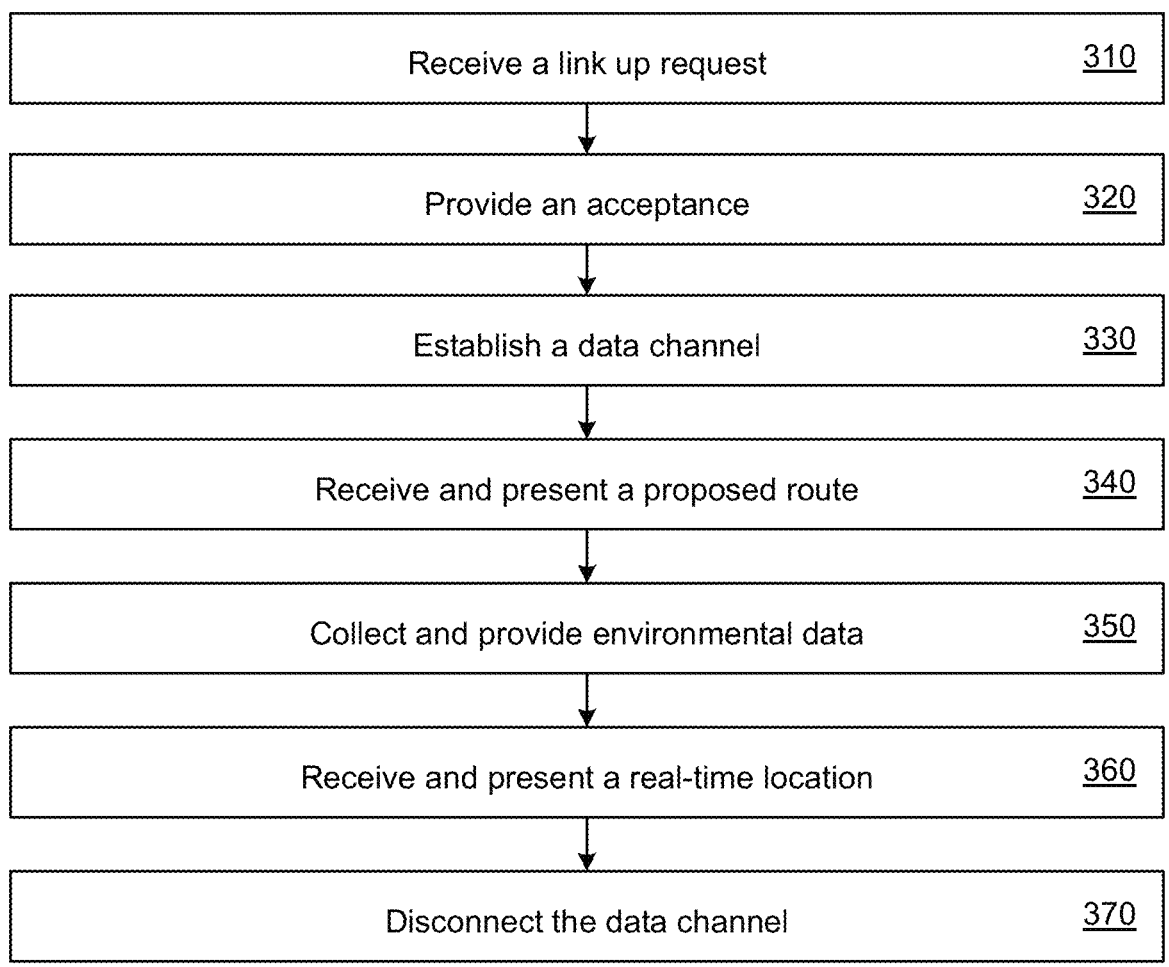
FIG. 3 is a flowchart for a computer-implemented method for linking devices and protecting data, according to some embodiments.

Referring now to FIG. 3, a flowchart for a method 300 for linking devices and protecting data is shown, according to some embodiments. Client devices 110 (e.g., 110*a* and 110*b*) can be configured to perform method 300. Further, any computing device described herein can be configured to perform method 300.

In a broad overview of method 300, at block 310, the one or more processing circuits (e.g., client devices 110 in FIG. 1) can receive a link up request including a link up location. For example, the request could come from a user planning a meet-up with friends at a football game, indicating the specific entrance gate as the link up location. In some arrangements, the link up request can include identifiers for the invitee devices expected to join. For example, the request may specify the mobile device IDs of all attendees, facilitating a more secure and targeted connection.

At block 320, the one or more processing circuits can provide, to a protection system, an acceptance of the link up request. For example, the devices of the attendees may send back a confirmation message with their current location data. In some arrangements, the acceptance can include verification tokens to authenticate the response. For example, each device might include a unique QR code or digital signature in their acceptance to ensure security and verify the identity of the attendees.

At block 330, the one or more processing circuits can, in response to the acceptance, establish a data channel with the protection system. For example, a secured connection is set up to share location updates and notifications. In some arrangements, establishing a data channel can include setting up encrypted communication to protect the privacy of the participants. The protection system can facilitate the link up, and the user device (e.g., processing circuits) can monitor the real-time locations of all participants. For example, the app could display the live location of all attendees on a map, updating their positions as they move.

At block 340, the one or more processing circuits can receive and present, via a graphical user interface (GUI) of an application, a proposed route to the link up location and at least one real-time location (or near real-time location, or past location) of one of a plurality of invitee devices or an inviter device, wherein the proposed route is based on a first geographic location of the user device. For example, the app may suggest the most efficient route for each attendee to reach the designated meetup point. In some arrangements, the proposed route can adjust in real-time based on changes in the attendees' locations and traffic conditions. For example, if a road closure occurs, the app could immediately suggest alternative routes to the meetup point.

At block 350, the one or more processing circuits can collect and provide, via the data channel, environmental data. For example, this could include weather updates, crowd density information, or event-specific alerts. In some arrangements, collecting environmental data and providing the environmental data can include integrating with external APIs for live updates. For example, the app could pull data from weather services and social media feeds to give attendees a comprehensive view of conditions at the link-up location. In another example, the processing circuits might alert users to leave earlier due to a forecasted storm.

At block 360, the one or more processing circuits can receive and present, via the GUI of the application, a real-time location of at least one of the plurality of invitee devices or the inviter device. For example, attendees can see how far away their friends are from the meetup point. For example, the host could monitor when each guest is likely to arrive and coordinate accordingly. The real-time location can be displayed on an interactive map within the app. In some arrangements, presenting can include options for attendees to communicate directly through the app, allowing them to coordinate or adjust meetup details as needed. For example, attendees could send messages or share updates on their estimated time of arrival directly through the app.

At block 370, the one or more processing circuits can, in response to determining the one or more processors completed the link up request at the link up location, disconnect the data channel connecting the one or more processors and the protection system. For example, once all attendees have arrived, the app could automatically close the link-up event and cease location tracking to preserve battery life and privacy. In some arrangements, disconnecting the channel can include sending a final notification to all participants confirming the successful meetup. For example, when the link up request is completed, the app might send a "Link Up Successful" message and offer options for group photos or event check-ins to social media platforms.

Additional, fewer, or different operations may be performed depending on the particular arrangement. In some embodiments, some, or all operations of method 300 may be performed by one or more processors executing on one or more computing devices, systems, or servers. In various embodiments, each operation may be re-ordered, added, removed, or repeated.

In some embodiments, the one or more processing circuits can present real-time location data of invitees or the inviter device when the one or more processing circuits are not geographically moving. In one aspect, this location sharing may only be activated when the processing circuits determine that the device is stationary. For example, if a user is at the designated link up location and not moving, the real-time location data will be available to other participants. Conversely, if a user is in transit or moving around, their real-time location data will not be shared to preserve their privacy. This dynamic location sharing feature provides users with a greater sense of control over their personal information while still enabling them to connect with others during link up events.

Referring generally to FIGS. 4-5, example illustrations of a graphical user interface, according to some embodiments. In general, FIGS. 4A-5K illustrate the graphical user interface that can be rendered at the client device 110 to execute and perform link ups. The graphical user interface can include a plurality of interfaces, objects, and selectable elements. For example, the client device 110 can execute to provide the graphical user interface with link up information (e.g., initiate a link up, ongoing link up data, historical link up data) based on events executed in application 112. The graphical user interface can include a plurality of interfaces, objects, and elements such that an individual (e.g., a user or human operator) can provide biological data (e.g., stress level, heart rate, hand geometry, facial geometry, psyche, and so on) and/or behavioral data (e.g., haptic feedback, gesture, speech pattern, movement pattern (e.g., hand, food, arm, facial, iris, and so on), intangible feedback (e.g., selection of intangible content displayed on client device 110, response to stimuli, etc.) to interact with the plurality of interfaces, objects, and/or elements. In various embodiments, the client device 110 may be of varying sizes, for example, a mobile phone, an IoT device, a smart watch, smart gear, a helmet, a virtual reality headset, an augmented reality headset, smart glasses, a hat, a headdress, and/or any type of mobile electronic device. Thus, the display and/or client device 110 is not limited to any specific combination of hardware circuitry and software.

In some implementations, the application 112 can modify the appearance and look of the graphical user interfaces (GUIs) (e.g., GUI 400 and GUI 500) based on the time of year (e.g., seasonal), particular day (e.g., $4^{th}$ of July), user religion, user age, user location, or type of link up (e.g., going to Halloween party). That is, the GUI theme and functionality offerings can be modified to align with seasonal activities or holiday celebrations, thus enhancing the user's engagement and festive spirit. For example, during Halloween, the GUI might display a scary theme with interactive elements like pumpkins and ghosts, which, when tapped, reveal link up details or Halloween party locations. In another example, on Valentine's Day, the GUI could feature a romantic theme with hearts and roses, offering suggestions for couple's activities and events. In yet another example, the GUI could be updated to reflect a winter wonderland during the Christmas season, with snowflake touchpoints leading to holiday market meet-ups. In yet another example, the GUI could feature bright festive colors on Holi for a Hindu user. Accordingly, the graphical user interface provided by application 112 can dynamically adjust its presentation and content to improve the user's experience in context with the seasonal or celebratory theme of the link up. In an additional implementation, the application 112 may modify the appearance and look of a destination icon on the GUI. For example, upon selection of a destination for a link up, a destination-specific icon may appear. The destination-specific icon may include, for example, a large trademark icon of the destination. By way of example, if the link up destination is selected as Warner Brothers Studios, a Warner Brothers Studios logo may appear floating above the destination location on the map. In another example, if the link up destination is a coffee shop, a large cup of coffee may appear above the destination location. In this manner, the GUI may aid a user in navigating to a destination by displaying relevant pictorial information to the user.

In some implementations, application 112 can create or allow the creation of customized link up invites for events, such as stylized digital invitation cards. That is, the GUI (e.g., GUI 400 or GUI 500) can offer a suite of tools for an inviter to design personalized invitations, with thematic graphics, interactive elements, and link up information tailored to the nature of the event, like a birthday party or wedding. For example, for a birthday celebration, the GUI could provide templates that incorporate balloons and cakes, where tapping a balloon could reveal the time of the link up, and the cake might display the venue. In another example, for a wedding link up, the invitation could be styled with floral borders, and selecting a flower could allow guests to RSVP and link up to the destination. In yet another example, for a corporate event, the GUI could offer a template with the company's branding, where interactive elements might outline the agenda of the link up. Accordingly, the graphical user interface provided by application 112 can be adapted to enable users to customize event-specific invitations. For example, in preparation for a wedding, application 112 could be used to send out link up requests to all the guests with a wedding-themed interface. These requests can double as digital invitations and, once accepted, allow the couple to track the progress of invitees on the wedding day. The application 112 on the GUI could also play the couple's chosen wedding music for guests as they travel to the location. On the wedding day, everyone's location (or everyone that shared their location) could be visible in the GUI, providing real-time updates on who has arrived.

Figure 4A:
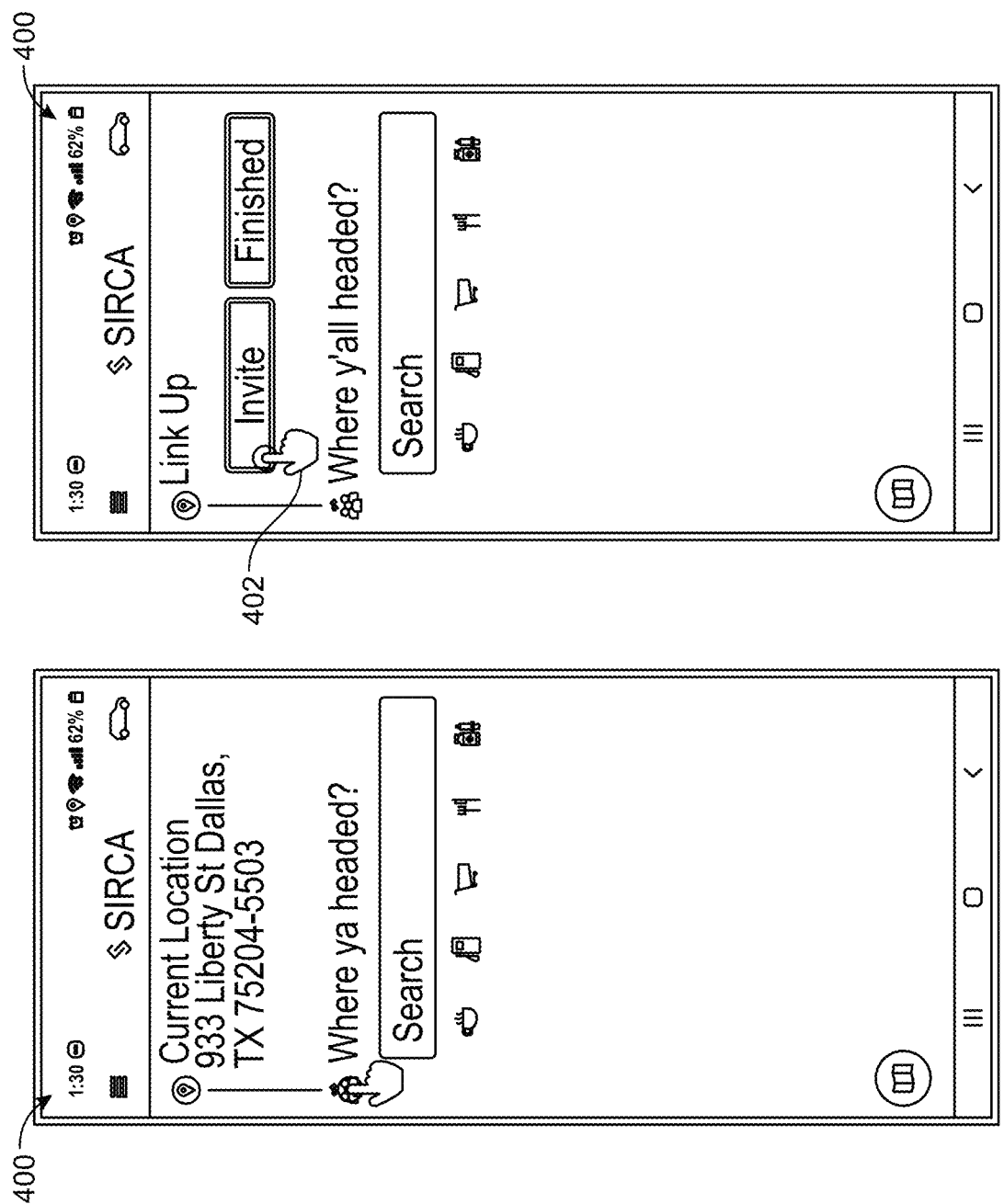
Figure 4B:
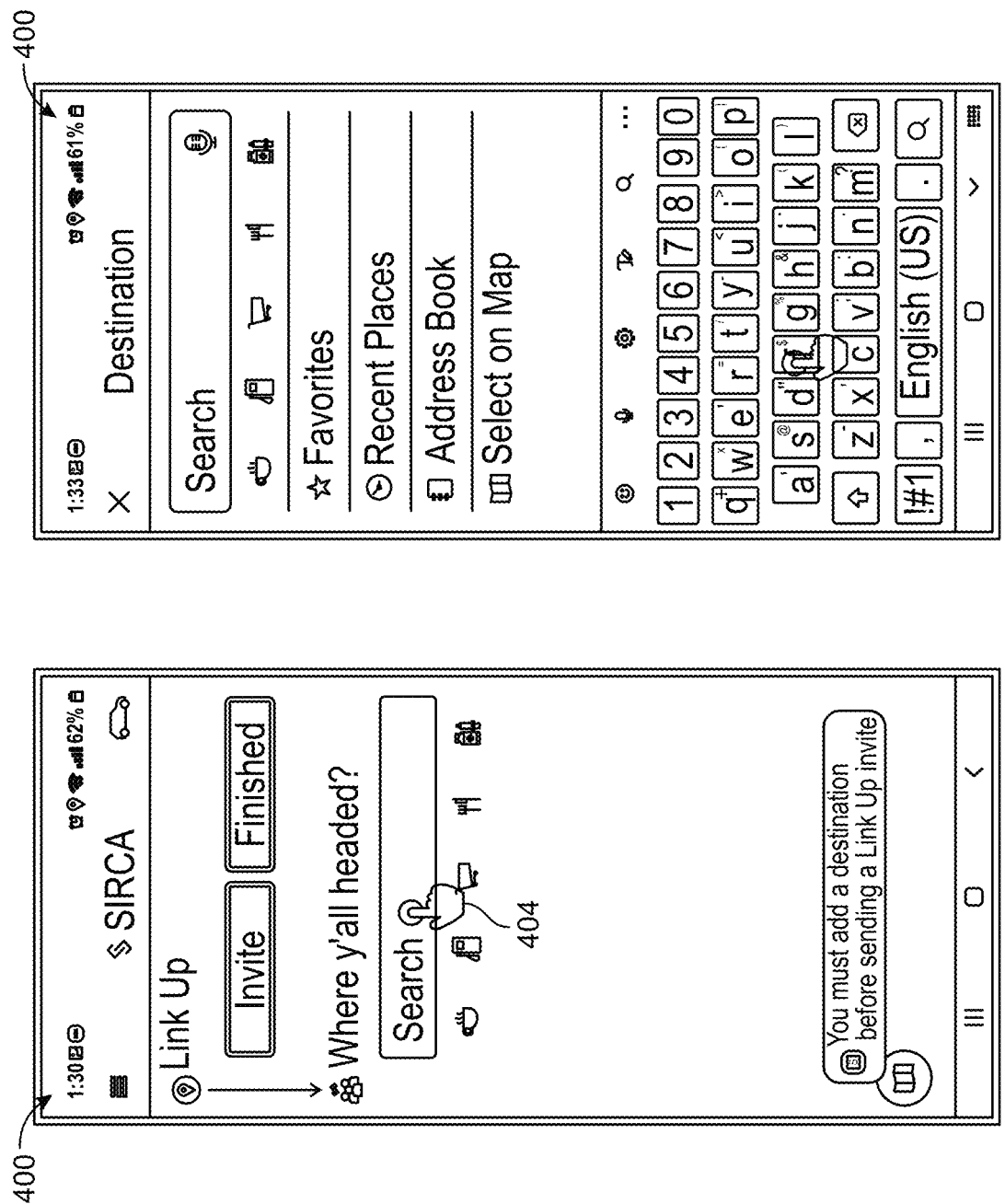
Figure 4C:
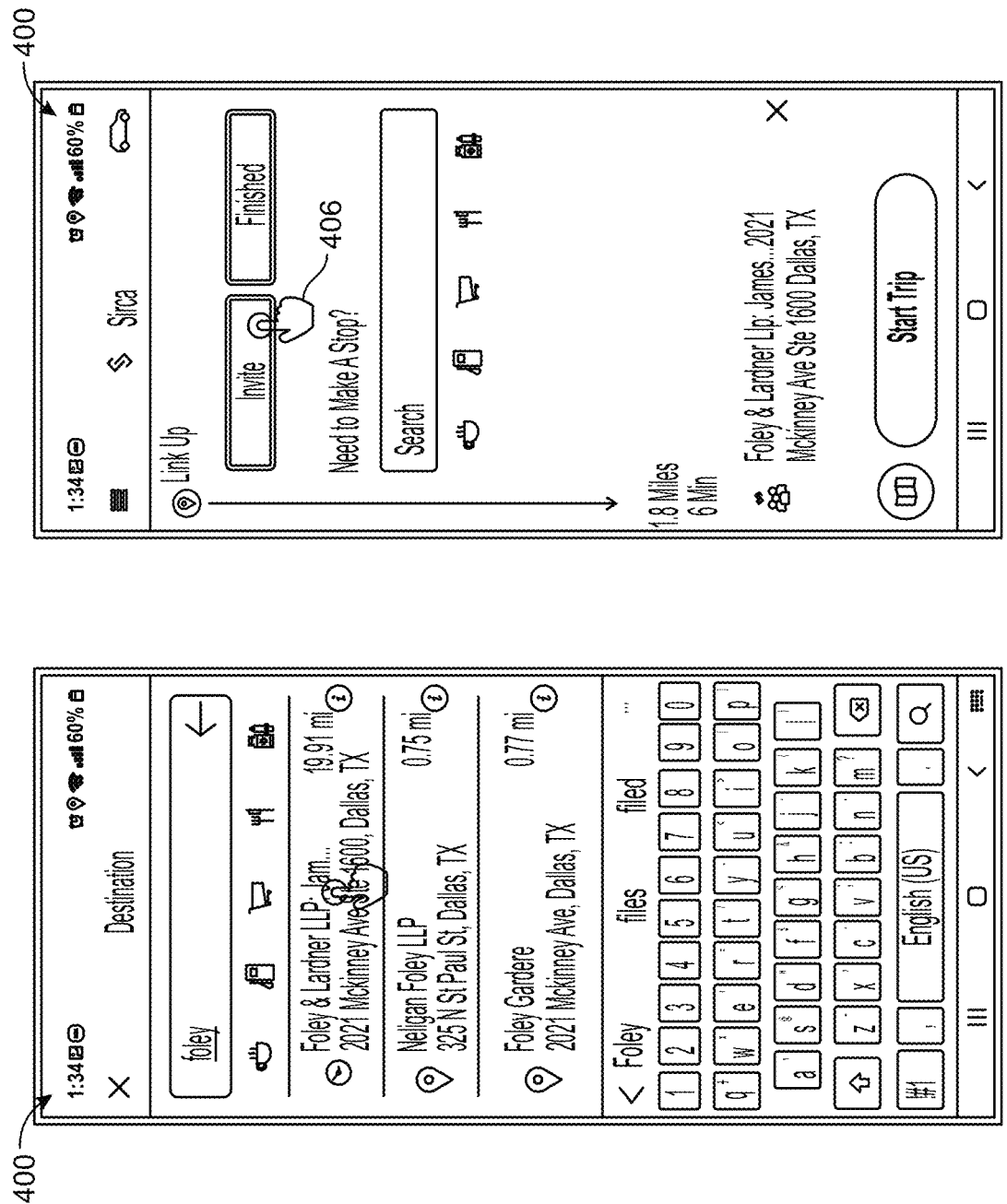
Figure 4D:
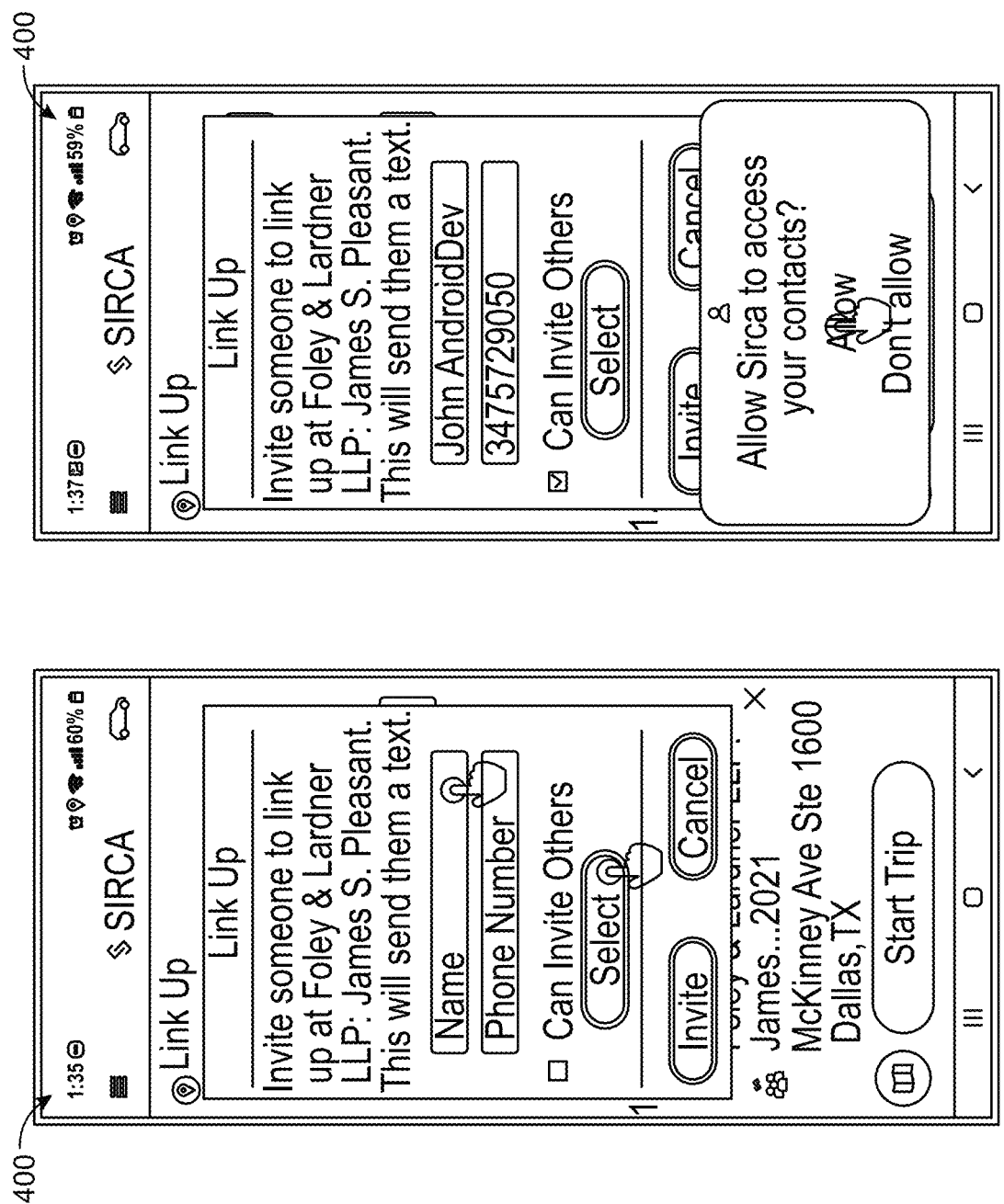

Referring now to FIGS. 4A-4K, example illustrations of a graphical user interface, according to some embodiments. FIGS. 4A-4K disclose a method to setup and perform a link up. The method includes setting a link up location (or destination), inviting friends or other individuals (by the inviter), adding any stops, and begin progressing towards the link up. For example, in FIG. 4A, the user can open application 112 to present a graphical user interface (GUI) 400. The GUI 400 can allow the user to interact with GUI 400 and select interactable element 402 to invite one or more individuals to link up. In FIG. 4B, the user can interact with GUI 400 and select interactable element 404 to search a link up location. In some arrangements, the link up location should be added prior to inviting an individual to link up. In FIG. 4C, after the user selects a link up location, the user can interact with GUI 400 and select interactable element 406 to invite one or more individuals to link up at the particular link up location. In FIG. 4D, a pop-up or another interactable element can be presented in GUI 400 allowing the user to interact the pop-up to invite an individual to link up. In some arrangements, the user can add 1 to n number of individuals to the link up. Additionally, another pop-up or interactable element can be presented in GUI which can be interacted with by the user to allow application 112 to access the contacts of the user.

Figure 4E:
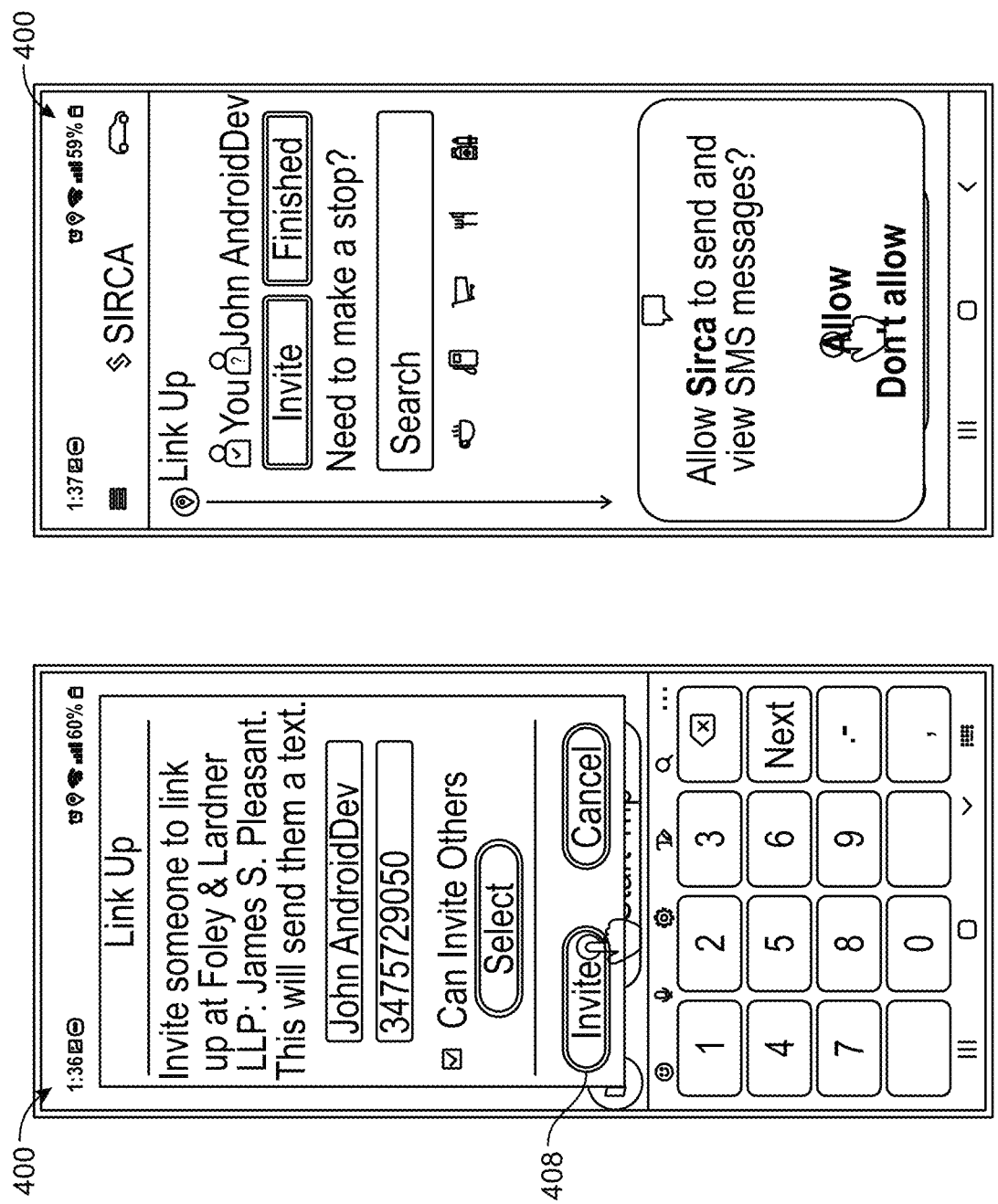
Figure 4G:
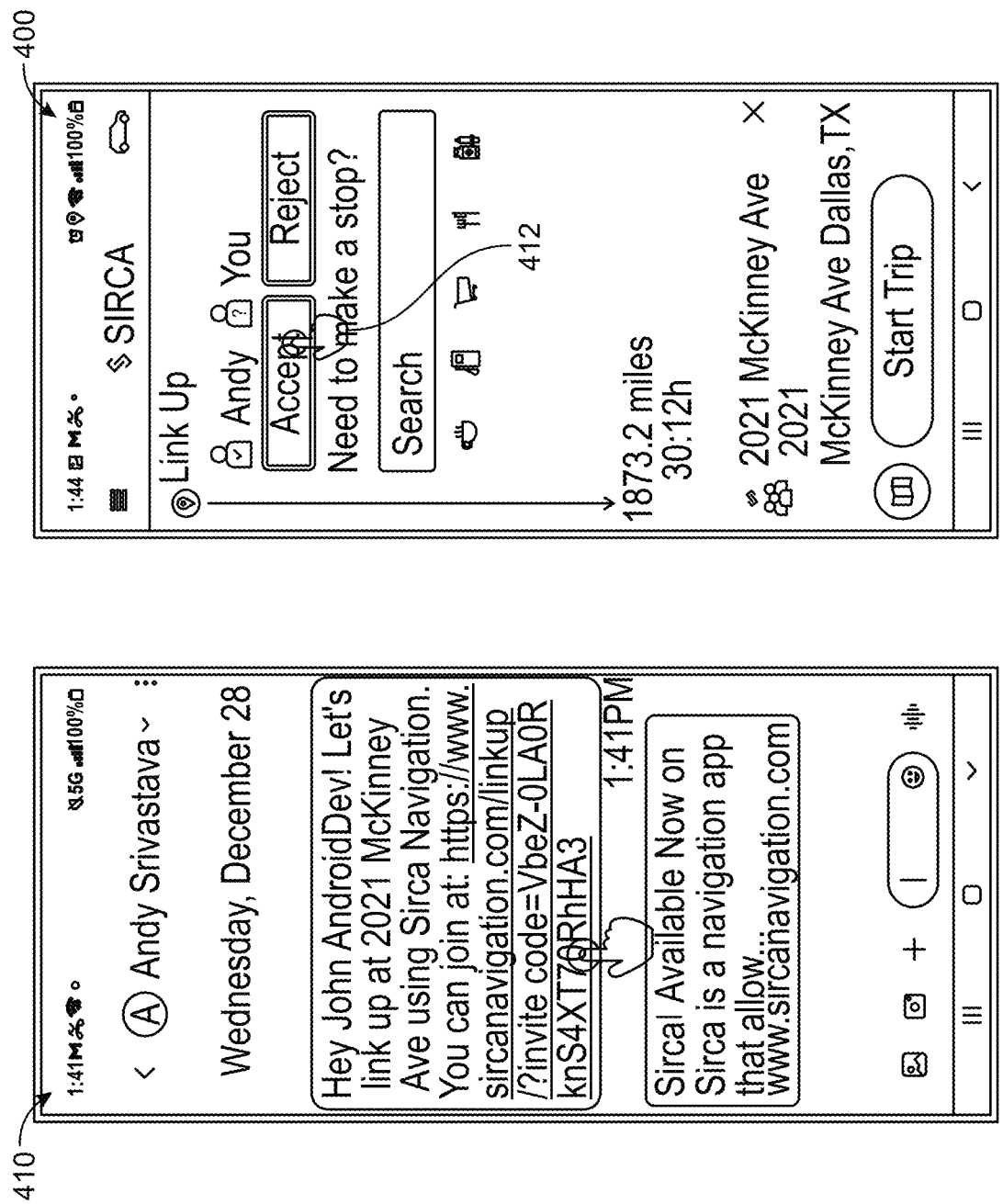

In FIG. 4E, the user can interact with GUI 400 and select interactable element 408 to invite the entered individual or individuals. Additionally, another pop-up or interactable element can be presented in GUI 400 which can be interacted with by the user to allow application 112 to send messages (e.g., SMS messages, emails, phone calls). Additionally, once someone is invited, the individual can appear on GUI 400 under the link up content. In FIG. 4F, the GUI 400 can indicate the link up request was sent and delivered, and the invited individual can receive text messages depicted in GUI 410 (e.g., a messaging application) of the invited individuals computing device. In FIG. 4G, after the invited individuals downloads the application or accesses a web portal, GUI 400 can allow the invited individual to interact with GUI 400 to accept the link up request by selecting interactable element 412. In some arrangements, various details of the link up can be presented in GUI 400.

Figure 4I:
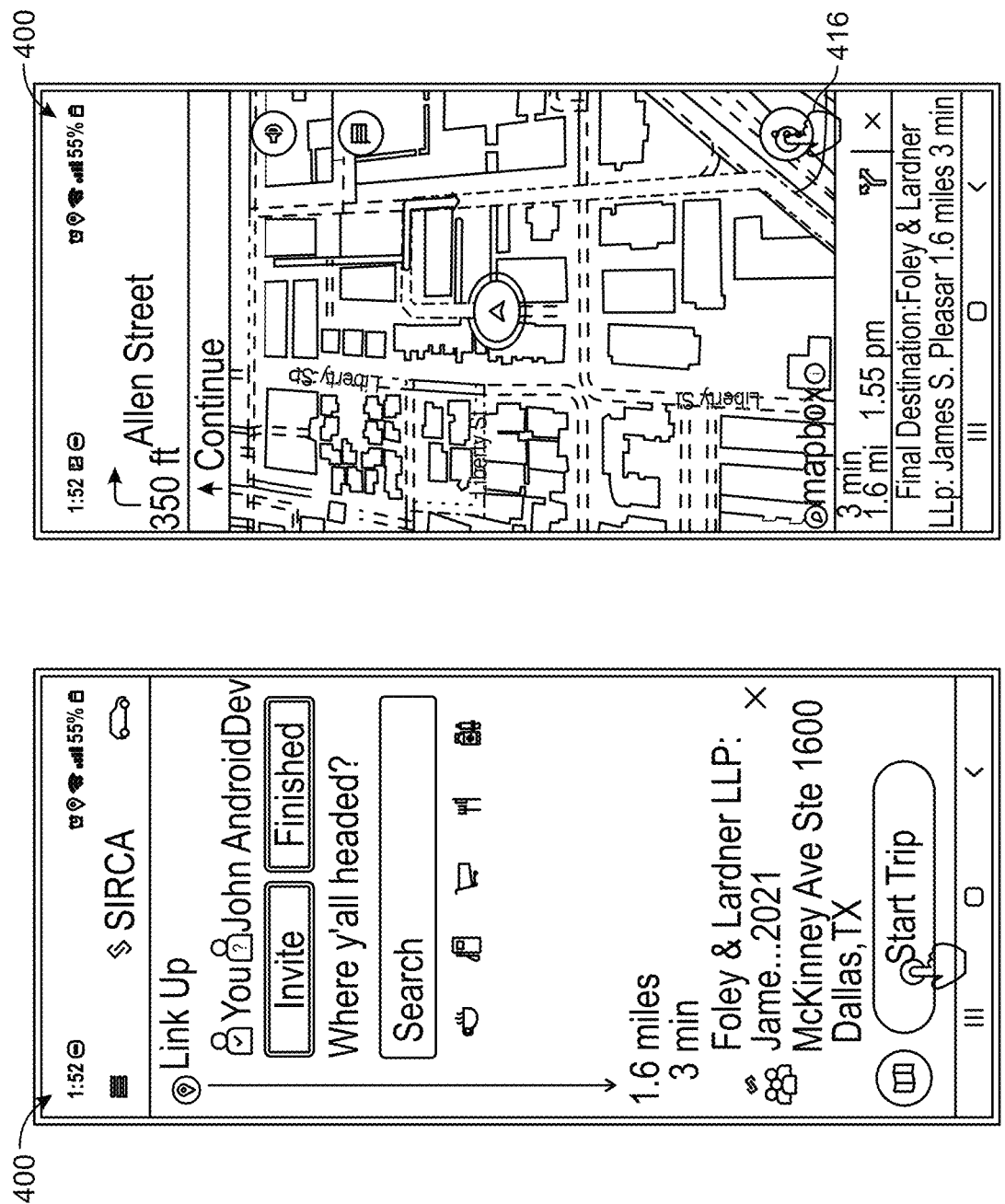

In FIG. 4H, the user (invitee or inviter) can start the link up trip on GUI 400 by selecting interactable element 414. In some arrangements, upon acceptance of the link up request, the invitee or inviters GUI 400 of application 112 can automatically start the trip. After the trip is started, the GUI 400 can present their route to the link up location. In some arrangements, the GUI 400 can allow the trip to be paused and resumed. In FIG. 4I, the other individuals of the group can be notified an individual accepted the link up request by their avatar next to their name (e.g., John AndroidDev) having a check mark. In some arrangements, GUI 400 can allow the individual that accepted to trip to view the location of all users by selecting interactable element 416. In some arrangements, various details of the link up can be presented in GUI 400.

Figure 4K:
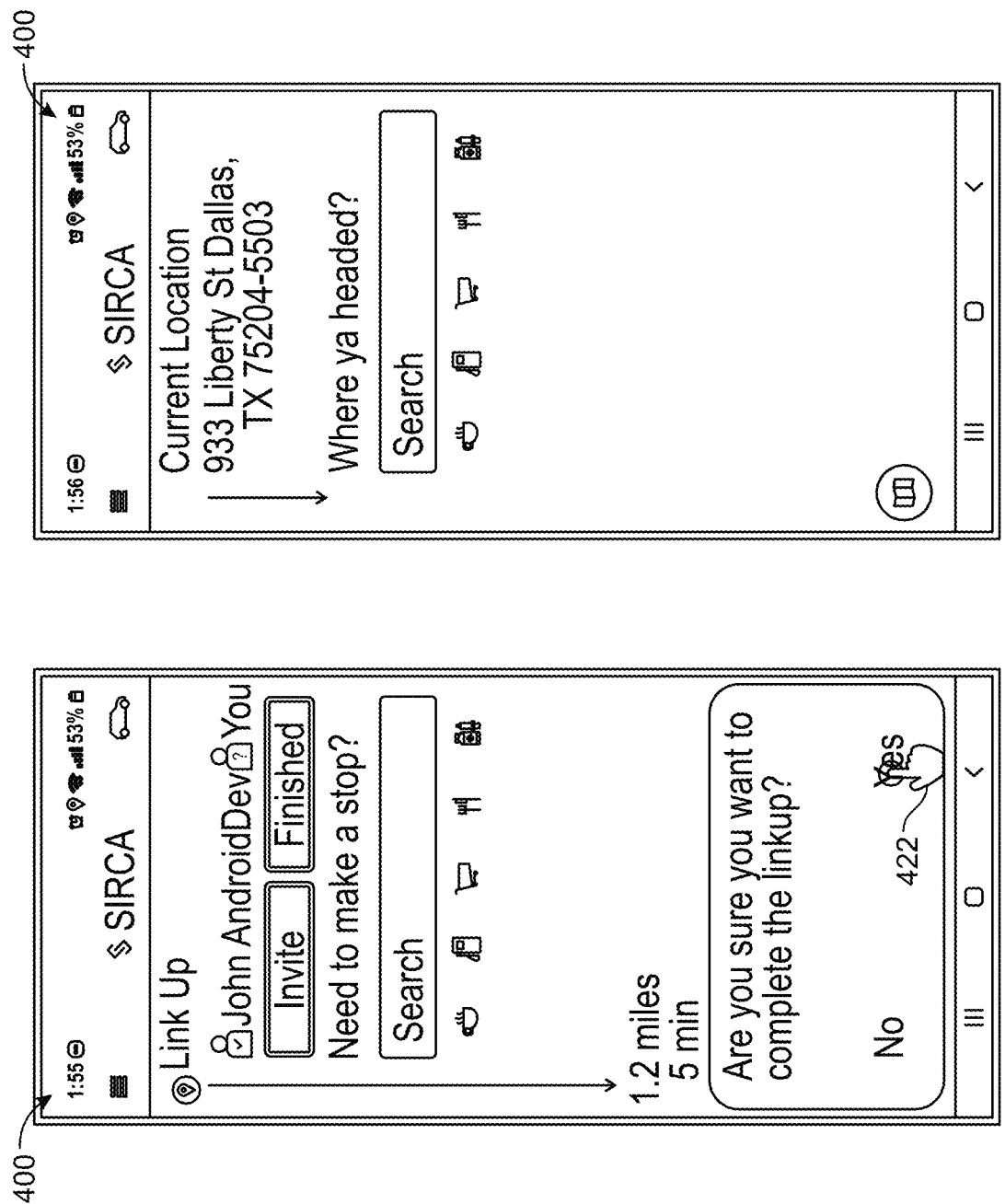

In FIG. 4J, the user (invitee or inviter) can view other users of the link up on GUI 400 by selecting interactable element 416 (shown also in FIG. 4) and in response, the application 112 can present additional selectable elements including the "View Link Up Map" selectable element 418. Upon selection, content item 420 can be presented on GUI 400 allowing one of the link up participant to view one or more locations of the other link up accepted individuals. In some arrangements, the content item can be colored, highlighted, or otherwise identified based on if the user is actively sharing their location. For example, a pink color can be presented on GUI 400 indicating the user is actively sharing their location with other link up participants. In another example, a gray color can be presented on GUI 400 indicating the user is not actively sharing their location with other link up participants. Accordingly, GUI 400 employs visual indicators such as color coding, highlighting, and icons to signify the location sharing status and other pertinent details of each participant, offering an overview that enhances group coordination and interaction during the link up. In FIG. 4K, the GUI 400 can allow an individual of the link up trip to complete the link up (or end the link up) by selecting interactable element 422. In some arrangements, the locations of the individual that completed the link up can be shared with the other individuals of the link up. For example, one location can be shared with the other individuals where the user ended the link up. In another example, a continuous location can be shared with the other individuals so that the other users of the link up can view prior to their completion of the link up.

Referring now to FIGS. 5A-5C, example illustrations of a graphical user interface, according to some embodiments. FIGS. 5A-5C disclose a method to setup and perform a link up a link up. The method includes setting a link up location (or destination), inviting friends or other individuals (by the inviter), adding any stops, and begin progressing towards the link up. For example, in FIG. 5A, the user can open application 112 to present a graphical user interface (GUI) 500. GUI 500 can include similar features and functionalities of GUI 400 of FIGS. 4A-4K. In some arrangements, the GUI 500 can allow the individual to create a link up, invite individuals, and add one or more intermediate stops for the link up. Additionally, after the link up creator enters invitee information a pop up can be displayed of a messaging application GUI 510 allowing the creator to send the invite to one or more individuals to join the link up. In FIG. 5B, the invited individual can interact with GUI 500 to also invite additional individuals to the link up. In some arrangements, prior to the avatar having a check mark (e.g., indicating acceptance of the link up), the individuals name can be presented above an "invited" indication on GUI 500. In some arrangements, one or more of the individuals of the link up can review the route and any stops. In FIG. 5C, the GUI 500 can allow the user to select the mode of travel using the one or more interactive elements (e.g., car, bike, walk/run, public transportation). In some arrangements, the GUI 500 can offer or the application 112 can request a rideshare or carpool to pick up the link up user and get them to the link up location. Additionally, during the link up a user can be presented with a pop up on GUI 500 to modify the link up or adjust settings (e.g., route settings, alternate routing, add a stop, edit or end route, close, etc.). In some arrangements, the next stop and final stop can be presented on GUI 500.

In some arrangements, a link up participant can send a notification or request to another link up participant to pick them up (e.g., because the person is on the way to the link up location) or have the rideshare one link up participant is using pick-up another participant of the link up. For example, during their journey to the link up location, Sarah, who is part of the link up, finds herself delayed due to unexpected traffic. Realizing she will pass by another link up participant, Tom, who is still at home, Sarah uses the GUI 500 to send a notification to Tom, suggesting she can pick him up on her way. The GUI 500 can facilitate this interaction by allowing Sarah to send a direct request to Tom, streamlining their coordination and ensuring they both arrive at the link up location together. In another example, Mike is using a rideshare service to get to the link up location and realizes that his route passes by Jenna's location. Through the application's GUI 500, Mike sends a request to the rideshare driver, via the app's integration, to make an additional stop to pick up Jenna. This feature within GUI 500 ensures efficient route planning and enhances the user experience by facilitating easy coordination among link up participants. In some arrangements, one link up participant can send a request to pick up another individual that is walking. For example, Alex, who decided to walk to the link up location, finds the walk longer than anticipated. Observing this, Jordan, who is driving to the same location and is nearby, sends a pick-up request through GUI 500 to Alex, offering a ride for the remaining distance. This gesture is facilitated by the application 112's functionality to communicate between participants and offer real-time solutions to improve the group's overall experience and convenience.

Referring now to FIG. 6, example illustrations of protecting data associated with link ups. As shown, information can be protected against other third-parties or other unknown parties when using link ups. The data protection framework allows individuals data to be protected and thereby improving security of mapping systems and collaboration applications. For example, typical map apps may include the user's name, gender, age, birthday, relationship status, previous actions (e.g., ordered pizza, type of pizza, other items order), previous music listed to, etc. However, the data protection framework described herein can anonymize the user, and protect various other data.

Figure 7A:
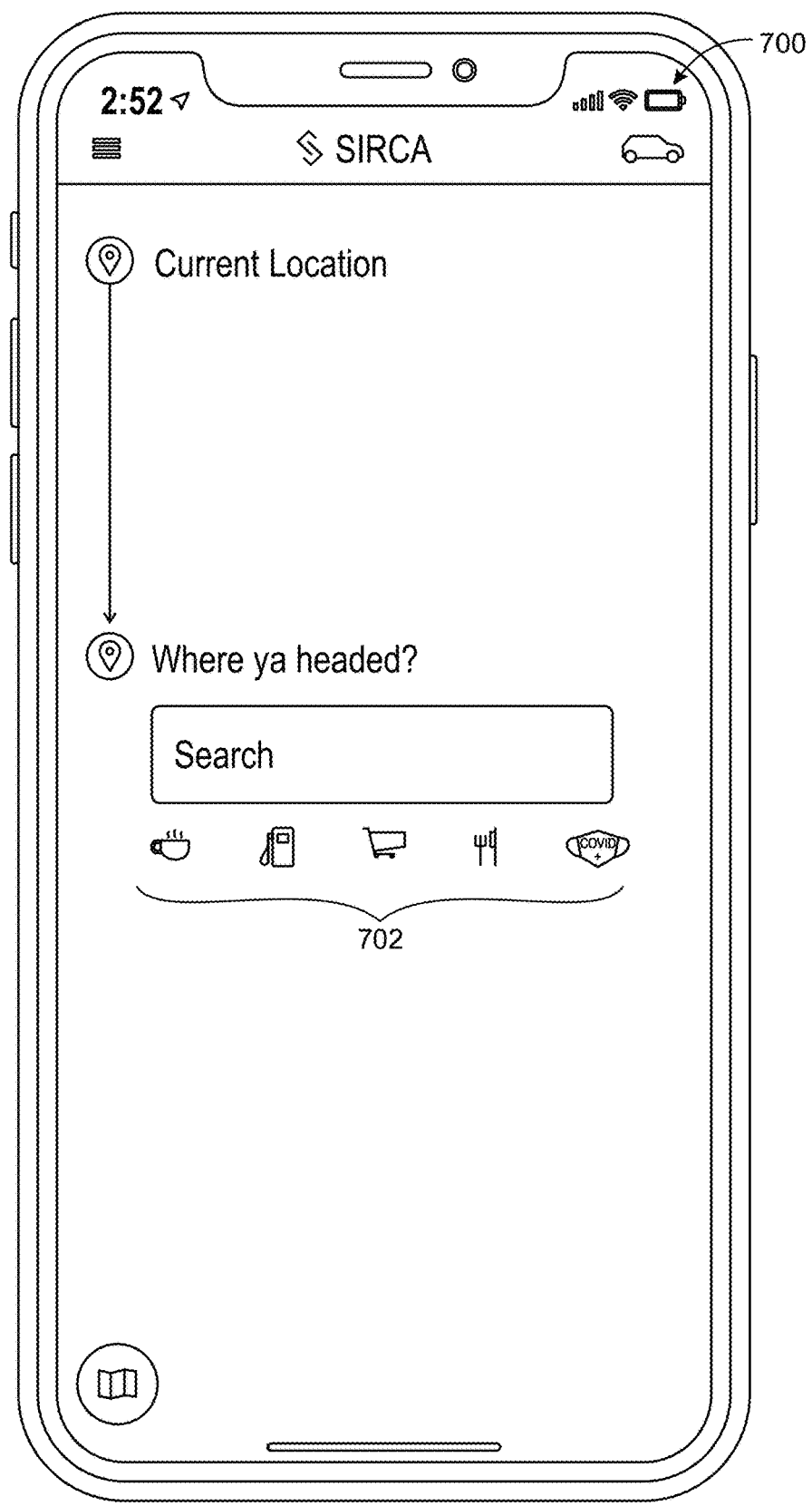
FIGS. 7A-7B are example illustrations of a graphical user interface, according to some embodiments.
Figure 7B:

Referring now to FIGS. 7A-7B, example illustrations of a graphical user interface, according to some embodiments. FIGS. 7A-7B disclose a wildcard functionality of the link up application described herein. The graphical user interface 700 shown in FIGS. 7A-B can include a plurality of interactable elements 702 related to the various available wildcards. For example, in response to selecting a wildcard, the GUI 700 can be updated. For example, in FIG. 7B COVID-19 Testing Centers can be displayed. The wildcard functionality enables individuals to set locations of interest. For example, instead of general locations of interest including grocery stores and coffee shops, an individual can configure on their user account particular locations of interest such as COVID-19 testing sites, specific gas stations, specific grocery stores (e.g., a grocery store brand or groceries stores that sell a certain product, such as kombucha), specific coffee shops e.g., a coffee store brand or coffee shops that sell a certain drink, such as cortado), specific restaurants, specific type of beer (e.g., breweries that sells sours), etc. For each wildcard, the user can further configure populated results based on preferences. For example, stars of the locations (e.g., only above 4.5 stars), current wait time of the locations (e.g., present locations with an hour wait or less), locations that allow reservations, etc.

In some implementations, the wildcard functionality could extend to include time-sensitive events or availability, such as farmers' markets on weekends or happy hours at restaurants. That is, users could specify interest in events that occur only on certain days or at certain times, enabling the application to provide targeted recommendations that fit their schedules. For example, a user might configure their preferences to include outdoor concerts occurring on Friday evenings, ensuring they receive notifications or suggestions only for events that match this criterion. In another example, the functionality could allow users to set alerts for when a preferred location meets specific conditions, such as when a popular restaurant has no wait time or when a specific product is in stock at a nearby store. That is, the application could monitor these conditions in real-time and notify the user immediately, making the feature highly practical for time-sensitive or high-demand scenarios. For example, users could be alerted when a newly released book becomes available at their local library, enabling them to reserve it ahead of others.

Figure 8:
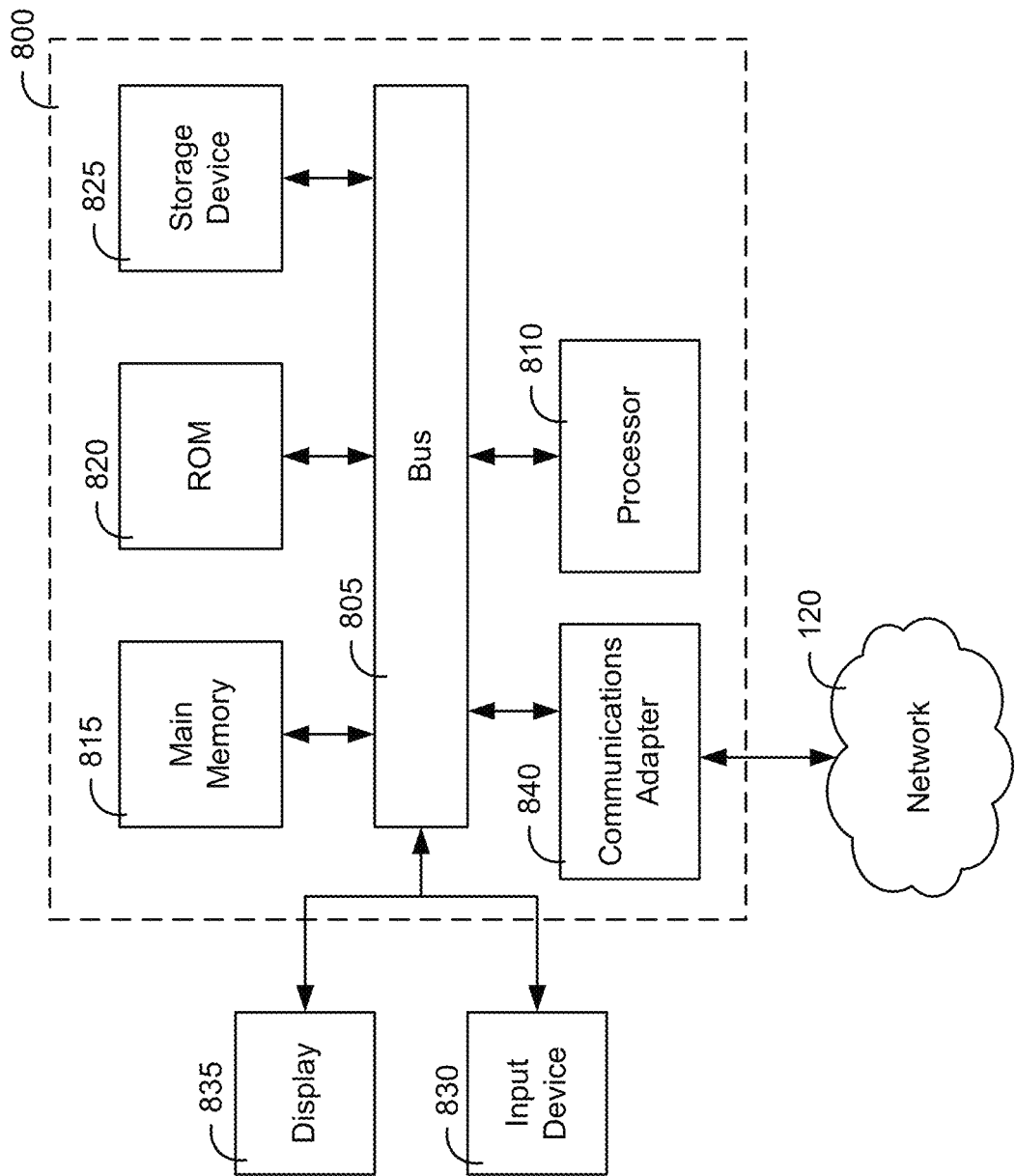
FIG. 8 is a block diagram illustrating an example computing system suitable for use in the various arrangements described herein.

FIG. 8 illustrates a depiction of a computer system 800 that can be used, for example, to implement an illustrative client device 110, an illustrative linking system 130, and/or various other illustrative systems described in the present disclosure. The computing system 800 includes a bus 805 or other communication component for communicating information and a processor 810 coupled to the bus 805 for processing information. The computing system 800 also includes main memory 815, such as a random-access memory (RAM) or other dynamic storage device, coupled to the bus 805 for storing information, and instructions to be executed by the processor 810. Main memory 815 can also be used for storing position information, temporary variables, or other intermediate information during execution of instructions by the processor 810. The computing system 800 may further include a read only memory (ROM) 820 or other static storage device coupled to the bus 805 for storing static information and instructions for the processor 810. A storage device 825, such as a solid-state device, magnetic disk or optical disk, is coupled to the bus 805 for persistently storing information and instructions.

The computing system 800 may be coupled via the bus 805 to a display 835, such as a liquid crystal display, or active matrix display, for displaying information to a user. An input device 830, such as a keyboard including alphanumeric and other keys, may be coupled to the bus 805 for communicating information, and command selections to the processor 810. In another implementation, the input device 830 has a touch screen display 835. The input device 830 can include a cursor control, such as a mouse, a trackball, or cursor direction keys, for communicating direction information and command selections to the processor 810 and for controlling cursor movement on the display 835.

In some implementations, the computing system 800 may include a communications adapter 840, such as a networking adapter. Communications adapter 840 may be coupled to bus 805 and may be configured to enable communications with a computing or communications network 120 and/or other computing systems. In various illustrative implementations, any type of networking configuration may be achieved using communications adapter 840, such as wired (e.g., via Ethernet), wireless (e.g., via Wi-Fi, Bluetooth, etc.), pre-configured, ad-hoc, LAN, WAN, etc.

According to various implementations, the processes that effectuate illustrative implementations that are described herein can be achieved by the computing system 800 in response to the processor 810 executing an arrangement of instructions contained in main memory 815. Such instructions can be read into main memory 815 from another computer-readable medium, such as the storage device 825. Execution of the arrangement of instructions contained in main memory 815 causes the computing system 800 to perform the illustrative processes described herein. One or more processors in a multi-processing arrangement may also be employed to execute the instructions contained in main memory 815. In alternative implementations, hard-wired circuitry may be used in place of or in combination with software instructions to implement illustrative implementations. Thus, implementations are not limited to any specific combination of hardware circuitry and software.

Although an example processing system has been described in FIG. 8, implementations of the subject matter and the functional operations described in this specification can be carried out using other types of digital electronic circuitry, or in computer software, firmware, or hardware, including the structures disclosed in this specification and their structural equivalents, or in combinations of one or more of them.

Figure 9:
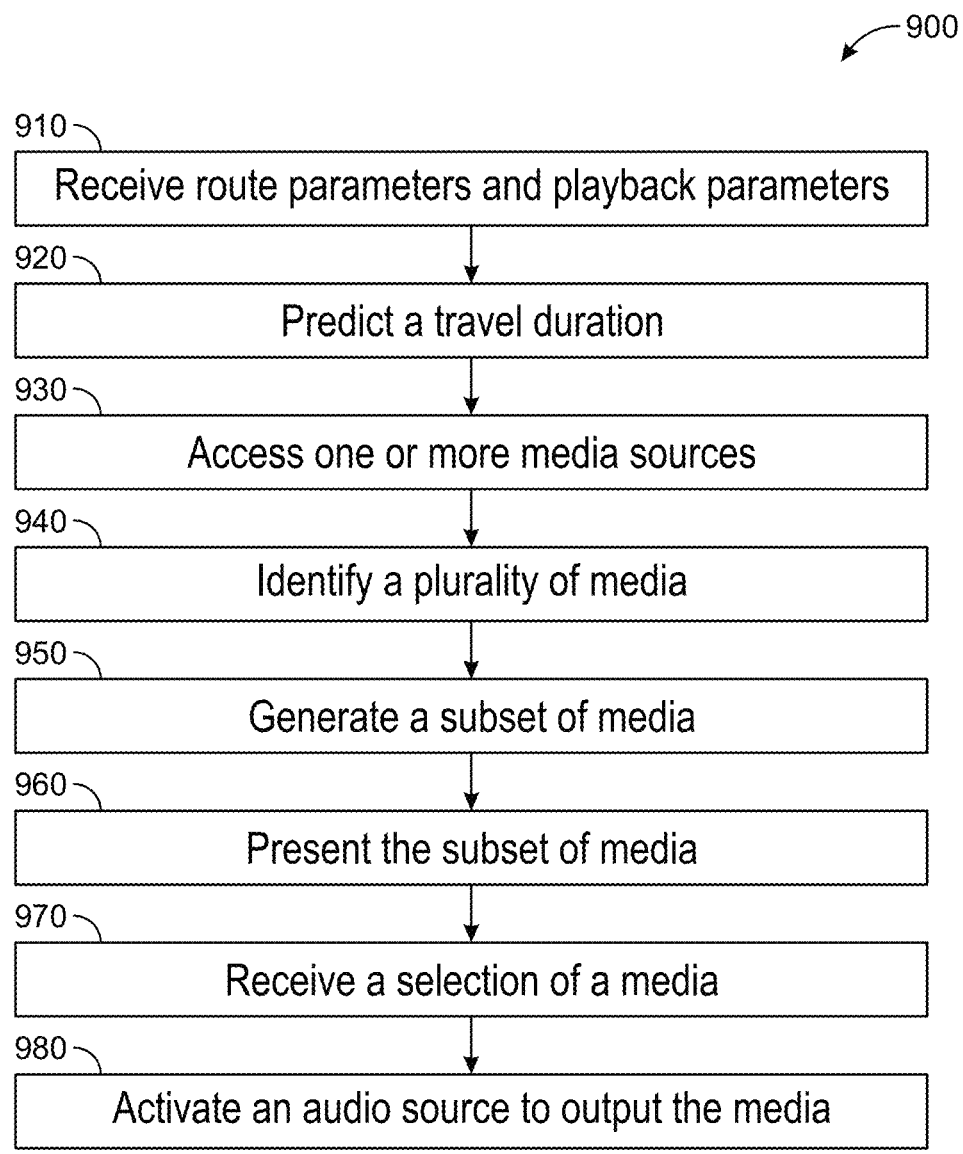
FIG. 9 is a flowchart for a computer-implemented method for recommending and playing media based on a predicted travel duration, according to some embodiments.

Referring now to FIG. 9, a flowchart illustrating a computer-implemented method 900 for recommending and/or playing media (e.g., audiovisual media) based on a predicted travel duration is shown, according to some embodiments. The system 100 may be configured to perform the method 900. Further, any computing device described herein can be configured to perform the method 900.

In broad overview of method 900, at step 910, one or more processors may receive route parameters and playback parameters. At step 920, the one or more processors predict a travel duration. At step 930, the one or more processors access one or more media sources. At step 940, the one or more processors identify a plurality of media. At step 950, the one or more processors generate a subset of media. At step 960, the one or more processors present for display the subset of media. At step 970, the one or more processors receive a selection of a media. At step 980, the one or more processors activate an audio source to output the media. Additional, fewer, or different operations may be performed depending on the particular arrangement. In some embodiments, some, or all operations of method 900 may be performed by one or more processors executing on one or more computing devices, systems, or servers. In various embodiments, each operation may be re-ordered, added, removed, or repeated.

At step 910, one or more processors of a user device receive route parameters and playback parameters. The route parameters may include a variety of data associated with a navigation route. Such data may include location information of the navigation route and a method of travel for the navigation route. Location data may include an initiation location of the navigation route, a destination location of the navigation route, and real-time conditions of the navigation route (e.g., construction, tolls, traffic). Additional information included in the location data may include additional stops along the navigation route, for example, an interim location to stop at a restaurant, a gas station, a tourist location, or run an errand. The location data may also include a time of day of travel and/or time of year of travel. For example, the location data may include a departure time or a desired arrival time. In some embodiments, the location data is received by the one or more processors as user input into the user device. In some embodiments, the location data is received from a standalone application running on the user device, such as a map or navigation application. The location data may be received through a network (e.g., the network 120 of FIG. 1). Returning to FIG. 9, the method of travel may be one or more modes of travel. For example, the method of travel may be, but is not limited to, by car, subway, walking, bike, public transportation, bus, airplane, ride-share, train, orbital vehicle, animal (e.g., a horse), ski, skate, sled, off-road vehicle, motorcycle, helicopter, ferry, tram, cable car, hot air balloon, personal transporter, jet ski, gondola, rickshaw, or boat.

The playback parameters may include one or more media attribute preferences and a playback rate threshold. According to at least one embodiment, the media attribute preferences may be associated with a media history of the user or a user input and may include preferred media type (e.g., a podcast, a song, a music video, a movie, an audiobook, a spoken word file, a text-to-speech transcription, a voice recording, a voicemail, a lecture, a training video, a seminar, a presentation, a new broadcast, a sports commentary, a talk show, a predicted phone call, a radio broadcast), a preferred media content (e.g., sports, entertainment, music, science, engineering, art, a specific topic), authors/speakers (e.g., book authors, podcast hosts, news anchors, celebrities, sports players), length of media (e.g., less than 10 minutes, less than one hour, longer than 30 minutes), media source (e.g., music application, news application, a website, a video player application, a radio station), depth of content (e.g., broad overview of topics, deep dives into topics), time periods of media (e.g., the 1950's, the 2000's, contemporary, classical), genre of media (e.g., jazz, rock, classical), language of media (e.g., English, Spanish, Latin, ASL), closed captioning (e.g., media with closed captioning or media without closed captioning), amongst others. The media attribute preferences may be received from a user input or historical user preferences as determined by previous selections and adjustments received during media playback of different content. Historical user preferences, selections, and/or adjustments may be stored in a user profile in a remote electronic storage location or locally on the user device.

In some embodiments, the media attributes are associated with a time of day of navigation. For example, a user's history stored in the user profile may include data that the user listens to financial updates in the morning when navigating from home to work and classical music in the evening when navigating from work to home. This bifurcated media preference may be used to recommend media based on the time of day and location of navigation.

According to some embodiment, the playback rate threshold corresponds to a maximum media playback speed. For example, the playback rate threshold may be a 2× playback speed. In such embodiments, the maximum media playback speed would be 2×, or, in other words, played back at twice the default (e.g., nominal) speed. Various types of media content may have varying playback rate thresholds. For example, music may have a playback rate threshold of 1× speed (e.g., the nominal speed). Podcast media may have a playback rate threshold of 1.5× speed. Seminars or lectures may have a playback rate threshold of 2× speed. The various playback rate thresholds may be received by user input or historical user preference as determined by previous adjustments received during media playback of audiovisual media content. In some embodiments, the one or more processors receive and/or select default playback rates for various media content types.

It should be understood that in some implementations of the methods and systems described herein, step 910 need not include receiving route parameters. For example, the systems and methods described in method 900 need not apply to navigational embodiments, as described in further detail below. Rather, in some embodiments, the route parameters may be replaced with "wait parameters." For example, the wait parameters may include data associated with a wait time. For example, a user may input into an electronic device an amount of time the user must wait until a next activity. In another example, the one or more processors may query one or more calendars, messages, voicemail, etc. for event or activity information with associated locations and/or times. In an example, a mother may be waiting to pick up her son from school. The activity "pick up son" may be in the mother's calendar at 4:00 pm. The one or more processors may receive the current time (e.g., 3:39 pm) and the calendar event time (e.g., 4:00 pm). These two times may be included in the received wait parameters. Likewise, the mother may input into the electronic device (e.g., through a stand-alone application not associated with navigation) how much time she has left before an activity (e.g., 21 minutes) without the processors accessing event information from a calendar or the like. This wait time may be included in the wait parameters. Thus, any discussion related to travel parameters/duration herein may also be applied to wait parameters/duration.

At step 920, the one or more processors predict a travel duration for the navigation route based on at least the method of travel. In some embodiments, the one or more processors estimate a time to travel from the initiation location to the destination location while traversing any additional interim locations. The one or more processors take into account the received mode of travel to determine the length of time to travel. In some embodiments, the one or more processors predict the travel duration based on real-time traffic data or route information (areas of high and low congestion with corresponding delays), construction data (e.g., road closures, detours, etc.), and toll data (e.g., toll amounts and options).

While in some embodiments the one or more processors predict the travel duration, it should be understood that one or more additional processors may also predict the travel duration and transmit the predicted travel duration to the one or more processors. For example, a remote server may execute one or more prediction protocols to predict the travel duration and transmit the predicted travel duration to the one or more processors of the user device. In some embodiments, the predicted travel duration is a range of time (e.g., 30-40 minutes). The predicted travel duration may be based on real-time route information received from one or more traffic data sources. For example, the real-time route information may include detours, traffic, closures, congestion, etc.

In an embodiment, the mode of travel may be a commercial means of travel (e.g., a commercial airplane, a bus, a train, a subway, etc.). In such embodiments, the predicted travel duration may be additionally, or alternatively, based at least in part on the scheduled departure time and/or the scheduled arrival time.

As discussed above, in some embodiments, the method 900 is not associated with a travel time, but rather a wait time. In such embodiments, the one or more processors determine a wait duration in place of a travel duration. For example, in the example provided above in which the current time is 3:39 pm and the mother is picking up her son at 4:00 pm, the wait duration (as opposed to the travel duration) may be determined (e.g., 21 minutes). This allows a user (e.g., the mother) to take advantage of the methods and systems described herein in situations beyond traveling (e.g., when sitting in a pick-up line at school).

At step 930, the one or more processors may access one or more media sources. The media sources may be associated with one or more media content platforms, such as Netflix®, YouTube®, Hulu®, Amazon Prime Video®, Disney+®, Spotify®, Apple Music®, and SoundCloud®. Additional media content platforms may include media databases (e.g., data sources 160 of FIG. 1) hosted remotely or local to the one or more processors. The media databases may host media files for access, retrieval, and/or playback by the one or more processors.

At step 940, the one or more processors may identify from the one or more media sources, a plurality of media having one or more media attributes matching the one or more media attribute preferences. According to an embodiment, the one or more processors may run one or more computer comparison protocols to compare media attributes of individual or bulk media stored in the one or more media sources to the received media attribute preferences. Likewise, various filtering techniques may be used to filter the media within the one or more media sources based on the one or more media attributes. Upon a media having one or more media attributes that satisfy the received media attribute preferences, the one or more processors identify the satisfying media as having one or more media attributes matching the one or more received media attribute preferences.

At step 950, the one or more processors generate, from the plurality of media, a subset of media. In one embodiment, each media within the subset of media can share one or more common attributes. In an exemplary embodiment, each of the media within the generated subset of media has a minimum playback duration within a playback range.

In some embodiments, each media has multiple playback durations. For example, a media may have a nominal playback duration, a minimum playback duration, a maximum playback duration, and/or an adjusted playback duration.

The nominal playback duration may correspond to a playback length of the media at a nominal (e.g., default) playback rate (e.g., a playback speed). In an exemplary embodiment, the nominal playback rate is 1× speed. This may be considered the default speed that the media is output at, either by way of a playback setting or an attribute of the media file.

The media may also have a minimum playback duration. The minimum playback duration may correspond to a shortest playback length of the media, based on the media being output at a maximum playback rate (e.g., a maximum playback speed). In an exemplary embodiment, the maximum playback rate is 2× speed. In some embodiments, as discussed above, varying media types and/or contents may have varying maximum playback rates. In at least one embodiment, the maximum playback rate corresponds with the playback rate threshold received in step 910.

The maximum playback duration may correspond to a longest playback length of the media based on the media being output at a minimum playback rate (e.g., a minimum playback speed). In an exemplary embodiment, the minimum playback rate is 0.75× speed. In some embodiments, varying media types and/or contents may have varying minimum playback rates. The minimum playback rate may correspond with the playback rate threshold received in step 910.

The adjusted playback duration may correspond to an adjusted playback length based on the media being output at an adjusted playback rate (e.g., an adjusted playback speed). The adjusted playback rate may be any playback speed multiplier for increasing or decreasing the playback speed of media, but in an exemplary embodiment, the adjusted playback rate is within the minimum playback rate and the maximum playback rate.

It should be understood that the media may have one or more playback durations that are the same length. For example, in some embodiments, the maximum playback rate of music may be the same as the nominal playback rate (e.g., 1× speed) of music, as it may be preferable to not increase the playback rate of music. In such embodiments, the nominal playback duration and the minimum playback duration may be the same. Likewise, the minimum playback rate may be the same as the nominal playback rate and the maximum playback rate. In such embodiments, the maximum playback duration, the nominal playback duration, and the minimum playback duration may be the same length.

In some embodiments, the playback range extends from a lower limit to a higher limit. In various embodiments, the lower limit is 0 minutes, and the higher limit is the predicted travel duration (or the higher/lower predicted travel duration within the range of values). In some embodiments, the lower limit may be longer than 0 minutes and may be received by the one or more processors as a user input/preference (e.g., at least half the predicted travel duration).

In some embodiments, the one or more processors generate the subset of media without first identifying a plurality of media having one or more media attributes. In such embodiments, the one or more processors may have not received any media attribute preferences and the one or more processors generate a subset of media with each individual media within the subset of media satisfying the minimum playback duration, regardless of the media attributes.

When determining minimum playback durations, the one or more processors may take into account predetermined segments of the individual media. For example, when determining whether a minimum playback duration of an audiobook fits within an estimated or predicted travel duration, the one or more processors may look to individual chapter lengths. Individual chapters may be considered predetermined segments of the media, likewise, author- or publisher-created chapters for podcasts, videos, performances, lectures, etc. may be considered predetermined segments of the media. The one or more processors may consider individual chapter lengths as a "minimum playback duration" when determining whether the media can be played back during the estimated travel duration.

At step 960, the one or more processors present for display on the user device, the subset of media via a GUI or AUI (auditory user interface) of an application executed by the one or more processors. In one embodiment, the subset of media is presented on the GUI as selectable graphical components. The subset of media may be presented for display with various media attributes associated with the media. For example, the media attributes may include the various playback durations (with corresponding playback rates), genre, title, author, host, description, etc. At step 970, the one or more processors receive a selection of a media from the subset of media. The selection may be made and received as a user input by the one or more processors.

At step 980, in response to receiving the selection of the media from the subset of media, the one or more processors activate an audio source of the user device or an external device to output the media from the subset of media. The user device may be the client device 110a of FIG. 1. The external device may be a vehicle or other audio playback device, such as an audio transducer (e.g., a speaker, headphones, etc.). In various embodiments, the one or more processors activate the audio source to output the media at a playback rate less than the playback rate threshold, thereby reproducing the entire media file within the predicted travel duration at a speed within the playback rate threshold.

By way of a non-limiting example, the one or more processors may receive a user input of a playback rate threshold of 1.5× speed for playing podcast episodes (a preferred media attribute of a user associated with the one or more processors). After receiving a method of travel (e.g., travel by car) and an initiation location and a destination location, the one or more processors determine a navigation route between the initiation location and the destination location. The one or more processors predict the duration of travel to be 1 hour, based on real-time traffic conditions, length of navigation route, and average speeds of a car (or historical speeds of the user). The one or more processors access various media sources associated with a user profile associated with the one or more processors. Upon accessing the various media sources, the one or more processors identify various media files satisfying the preferred media attribute (e.g., podcast episodes). Upon identifying various media files satisfying the preferred media attribute, the one or more processors then determine a minimum playback duration of each of the various media files satisfying the preferred media attribute by adjusting a nominal playback duration of each media file to the playback rate threshold of 1.5× speed and determining a resulting playback duration. The one or more processors then generate and present for display a list of the media files that have a minimum playback duration less than the predicted travel duration. In presenting media files that have a minimum playback duration less than the predicted travel duration, any of the presented media files may be chosen and completely reproduced within the predicted travel duration. Once a selection of one or more of the presented media files is received by the one or more processors, the one or more processors cause the media file to be acoustically and/or visually output at a playback rate. In some embodiments, the one or more processors reproduce the media file at the nominal (or other default) playback rate if the nominal (or other default) playback duration is within the predicted travel duration. If the nominal playback duration is longer than the predicted travel duration, the one or more processors may reproduce the media file at an adjusted playback rate, the adjusted playback rate being the minimally increased rate such that the adjusted playback duration is less than the predicted travel duration. In some embodiments, the predicted travel duration is continually updated (e.g., at periodic intervals) during the user's navigation along the navigation route (as determined by the one or more processors) and the one or more processors continually adjust the adjusted playback rate of the media file (up to the playback rate threshold) such that the adjusted playback duration is maintained within the updated predicted travel duration while remaining under the maximum media playback speed. Some embodiments utilize a filtering of the predicted travel duration to avoid jumps in playback rate adjustments. Likewise, there may be one or more attributes of the playback adjustments to not allow the one or more processors to adjust the playback rate above a certain rate of change of the playback rate (i.e., increasing or decreasing the playback rate too fast).

Additionally, the systems and methods described here allow for improved sharing of audiovisual content to parties within a group by providing multiple users within a group with a single audiovisual media to consume during travel to a common destination while ensuring that each of the users is able to completely consume the audiovisual media during their respective navigations to the common destination.

In such embodiments, the one or more processors are configured to receive a plurality of route parameters and a plurality of playback parameters associated with users within a group. The one or more processors determine a predicted travel duration for each of the users within the group to travel to the common destination. The predicted travel duration for each user is based on the received plurality of route parameters and plurality of playback parameters associated with each individual user within the group. Upon identifying the predicted travel duration of all the users within the group, the one or more processors determine a minimum predicted travel duration corresponding to the user who has the shortest predicted travel duration. The one or more processors then generates a subset of media with an associated minimum playback duration within a second playback range. The second playback range may correspond to the minimum predicted travel duration, as described above. This subset of media is transmitted to an electronic device of each user within the group, thus allowing each in the group to completely listen to the same media prior to arriving at the common destination. In some embodiments, one of the users in the group selects a media to share with all of the users in the group. In some embodiments, the one or more processors may access a calendar or schedule to determine a meeting and suggest media for playback to all participants in the meeting based on the systems and methods described herein.

In additional embodiments, the methods and systems discussed herein may include corporate-sponsored media content to recommend and present to a user through one or more electronic devices configured for audio/media playback. By way of a non-limiting example, a user selects a destination location to which to travel. The user may select the location on a standalone navigation application, a standalone media playback application, or an integrated navigation/media playback application. The user may use gestures, voice commands, hardware input, etc. to select the destination location. In addition to the destination location, the user may select an initiation location (e.g., a location from where to initiate travel), an interim location (e.g., a location to pass from the initiation location to the destination location), and a mode of travel. As described above, a system may receive these selections and determine a navigational route (and corresponding estimated travel duration) from the initiation location to the destination location while passing through any interim locations. The navigational route may be associated with a minimum travel duration, a minimum travel distance, a minimum carbon output, a minimum elevation change, and/or may include several sponsored locations between the initiation location and the destination location (e.g., the system may alter the navigation route to pass by sponsored locations or location with sponsored content/media).

Upon determining the navigational route, the system determines whether or not the navigation route is associated with any sponsored media. In other words, the system determines whether the route passes by any locations associated with sponsored media. The locations may include the initiation location, the destination location, the interim location, and/or any location along (or near) the path. In an example, the user may select a theatre for a destination location. An entity associated with the chosen theatre (e.g., an owner of the theatre, an owner of a production being performed at the theatre, a director of a production being performed at the theatre) may create and post content associated with the theatre or the production being performed. The system may transmit a request for, and receive a response of, an indication from a server or electronic storage location of a list of events (with corresponding times and locations) occurring at the theatre and identify sponsored media corresponding to an event occurring at a time near an estimated arrival or departure time. Alternatively, the system may automatically receive the sponsored media upon transmitting the navigation route to a second server.

The sponsored media may be any media, but in an exemplary embodiment, it may contain historical or informational data related to the location. In the embodiment in which the user is navigating to the theatre, the sponsored media may include information about the production being put on at the theatre. This data may include audio or audiovisual information about the director, author, cast, history, schedule, and/or sponsors of the production. Thus allowing a user to listen and/or view relevant background information prior to arriving at the destination. While a theatre is used in the exemplary embodiment, it should be understood that the sponsored media may relate to any location or event, including a movie theatre, a sporting event, a seminar, a meeting, a symposium, a restaurant, a banquet, an awards event, a business, etc.

In some embodiments, the system may access the user's calendar or schedule to determine an event to which the user is navigating. The system may search for sponsored media associated with the event and present for selection any identified sponsored media on the user device.

Upon receiving the sponsored media, the system determines if a minimum playback duration of the sponsored media falls within a playback range. The minimum playback duration may, as described herein, relate to a playback duration at a maximum playback speed, as determined by the user's playback parameters and/or preferences. Responsive to the sponsored media having a minimum playback duration within the playback threshold (the playback threshold corresponding to the estimated travel duration to travel along the navigation route), the system presents the sponsored media for selection. The system may present the sponsored media (with or without an indication of its sponsored status) as an interactive graphical component on a display of the user device, configured for selection by the user. Additionally or alternatively, the system may access one or more user attributes in a user profile associated with the user to determine whether or not to automatically select to play the sponsored media. For example, the user may select a subscription service to not receive sponsored content/media, in which case the user may have a subscription attribute related to the chosen subscription service. In such embodiments in which the user selects the subscription service (and has a corresponding subscription attribute), the system receives the indication of the subscription attribute and does not automatically select the sponsored content for playback. In such embodiments, the system may still present the sponsored media for the user to select. In other embodiments, the user is not presented with the sponsored media if the user has a subscription attribute. If the user profile does not have the subscription attribute, the system may automatically select the sponsored media for playback.

Upon receiving the selection (either automatically by the system or from the user device), the system activates an audio source of the sponsored media of the user device or an external device (e.g., a speaker or automobile sound system) to output the sponsored media. In some embodiments, the system activates the audio source upon receiving an indication that the user has begun travel along the navigation route. This indication may come from a user selection of a "Begin Navigation" graphical element on the user device, a vehicle that begins traveling along the navigation trajectory, or from the user device determining that it is traveling along the navigation route. The sponsored media may be played at an adjusted playback rate as described herein, while ensuring that the playback rate does not exceed the maximum playback rate (e.g., a user preference associated with the fastest playback rate allowed).

In various embodiments, the sponsored media is corporation-sponsored content or media. Additional embodiments may include a restaurant sponsoring a sponsored media related to its menu and/or specials, the Emmy's sponsoring a sponsored media related to the nominees, a corporation sponsoring a sponsored media related to its business offerings, a university sponsoring a sponsored media related to its different programs, a sports team sponsoring a sponsored media related to the team's performance during the season; a developer sponsoring a sponsored media related to a new property development nearby, etc.

It is understood that while the destination location may be associated with sponsored media, locations along the navigation route may also be associated with sponsored media. For example, when driving by a new property development, the system may automatically play a sponsored media related to the upcoming offerings in the new property development (e.g., a price and square feet of a new home for sale). In some embodiments, the systems and methods herein may include directional information as well. For example, the processors may determine a direction of travel based on the route parameters, current and/or past location data, or sensor data (e.g., image data from one or more cameras). In such embodiments, the system may automatically play a sponsored media related to the upcoming offerings in the new property development but include directional information (e.g., "If you look to your right, you will see the new property development Shady Acres with new builds for sale and starting at $300,000.").

Implementations of the subject matter and the operations described in this specification can be carried out using digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively, or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer-readable storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be implemented as operations performed by a data processing apparatus on data stored on one or more computer-readable storage devices or received from other sources.

The term "data processing apparatus" or "computing device" encompasses all kinds of apparatus, devices, and machines for processing data, including by way of example, a programmable processor, a computer, a system on a chip, or multiple ones, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be carried out using a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be carried out using a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks, distributed ledger networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

In some illustrative implementations, the features disclosed herein may be implemented on a smart television module (or connected television module, hybrid television module, etc.), which may include a processing circuit configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TELEVISION channel, on a satellite TELEVISION channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services (e.g., Netflix, Vudu, Hulu, Disney+, etc.), a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a smart watch, a tablet PC, or other computing device.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be carried out in combination or in a single implementation. Conversely, various features that are described in the context of a single implementation can also be carried out in multiple implementations, separately, or in any suitable subcombination. Moreover, although features may be described above as acting in certain combinations and even initially claimed as such, one or more features from a claimed combination can, in some cases, be excised from the combination, and the claimed combination may be directed to a subcombination or variation of a subcombination. Additionally, features described with respect to particular headings may be utilized with respect to and/or in combination with illustrative implementations described under other headings; headings, where provided, are included solely for the purpose of readability and should not be construed as limiting any features provided with respect to such headings.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products embodied on tangible media.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method for linking devices and protecting data, the computer-implemented method comprising:
    receiving, by one or more processors from an inviter device, a link up request associated with a link up location corresponding to a geographical location for a plurality of devices comprising the inviter device and a plurality of invitee devices to meet, the link up request corresponding to a coordinated arrival of the plurality of devices;
    establishing, by the one or more processors, one or more data channels with the inviter device;
    providing, by the one or more processors, the link up request to each of the plurality of invitee devices, the link up request comprising the link up location;
    in response to receiving a first acceptance of the link up request from a first invitee device of the plurality of invitee devices, establishing, by the one or more processors, the one or more data channels with the first invitee device;
    generating and providing, by the one or more processors to the first invitee device via a first graphical user interface (GUI) of an application, a first proposed route to the link up location and at least one first location of one of the plurality of invitee devices or the inviter device, wherein the first proposed route is based on a first geographic location of the first invitee device and the link up location;
    in response to receiving a second acceptance of the link up request from a second invitee device of the plurality of invitee devices, establishing, by the one or more processors, the one or more data channels with the second invitee device;
    generating and presenting, by the one or more processors to the second invitee device via a second GUI of the application, a second proposed route to the link up location and at least one first location of one of the plurality of invitee devices or the inviter device, wherein the second proposed route is based on a second geographic location of the second invitee device and the link up location;
    collecting, by the one or more processors via the one or more data channels, environmental data of the inviter device and the plurality of invitee devices;
    providing, by the one or more processors to the inviter device via a third GUI of the application, a location of the first invitee device and the second invitee device based on the environmental data, wherein the location of the first invitee device and the second invitee device is presented on the third GUI of the application; and
    in response to determining at least one of the first invitee device or the second invitee device completed the link up request at the link up location, disconnecting, by the one or more processors, the one or more data channels connecting the one or more processors and the at least one of the first invitee device or the second invitee device.

2. The computer-implemented method of claim 1, wherein the link up request is associated with a predetermined link up with predetermined invitee devices, the computer-implemented method further comprising:
    determining, by the one or more processors, the predetermined link up based on social media data, wherein the predetermined link up is determined based on identifying trends in the social media data; and wherein the first proposed route is presented on the first invitee device, and wherein the presentation comprises an estimated time of arrival (ETA) for each of the inviter device, the first invitee device, and the second invitee device.

3. The computer-implemented method of claim 1, further comprising:
   determining, by the one or more processors, a stop along the first proposed route or the second proposed route; and
   providing, by the one or more processors, an intermediate location to at least one of the first invitee device or the second invitee device.

4. The computer-implemented method of claim 3, further comprising:
   receiving, by the one or more processors, a list of items associated with the link up request;
   determining, by the one or more processors, one or more stops within a geographic area of the link up request that comprises one or more of the list of items in stock;
   in response to receiving the first acceptance, offering, by the one or more processors, the one or more stops as selectable elements via the first GUI of the application, wherein determining the stop and providing the intermediate location are in response to receiving a selection of one of the selectable elements; and
   updating, by the one or more processors, the list of items indicating at least one item of the list of items is attributed to the first inviter device.

5. The computer-implemented method of claim 4, further comprising:
   updating, by the one or more processors, the one or more stops based on either the first proposed route or the second proposed route, wherein each of the one or more stops offered further comprise an incentive presented with a selectable element of the selectable elements.

6. The computer-implemented method of claim 1, further comprising:
   in response to determining at least one of the first invitee device or the second invitee device arrived at the link up location, sharing, by the one or more processors, a geographic location of the inviter device to the at least one of the first invitee device or the second invitee device.

7. The computer-implemented method of claim 1, wherein the link up request is a public link up request configured to share the link up request to a link up marketplace, the computer-implemented method further comprising:
   generating and providing, by the one or more processors via the application, the link up request to a plurality of public invitee devices, the link up request comprising the link up location, wherein the plurality of public invitee devices are determined based on an enrollment dataset.

8. The computer-implemented method of claim 1, wherein the first acceptance comprises privacy parameters for sharing data of the first invitee device, and wherein the privacy parameters comprises a plurality of data sharing levels associated with a type and amount of the data shared.

9. The computer-implemented method of claim 8, wherein a first level of the plurality of data sharing levels configures the one or more processors to share the data of the first invitee device with at most the inviter device, and wherein a second level of the plurality of data sharing levels configures the one or more processors to share the data of the first invitee device with at most the inviter device and one of the plurality of invitee devices, and wherein a third level of the plurality of data sharing levels configures the one or more processors to share the data of the first invitee device with the inviter device and one of the plurality of invitee devices.

10. The computer-implemented method of claim 8, wherein a first level of the plurality of data sharing levels configures the one or more processors to share unprotected data of the data of the first invitee device with at most the inviter device, and wherein a second level of the plurality of data sharing levels configures the one or more processors to share the unprotected data of the data of the first invitee device with the inviter device and one of the plurality of invitee devices, and wherein a third level of the plurality of data sharing levels configures the one or more processors to share the unprotected data and protected data of the data of the first invitee device with the inviter device and one of the plurality of invitee devices.

11. The computer-implemented method of claim 8, wherein the first invitee device is associated with a profile of the application, and wherein the first proposed route is based on a default location of the profile.

12. The computer-implemented method of claim 1, wherein:
   the first GUI and second GUI comprise to a look and feel (LF) theme based on the link up request, a user attribute, or the link up location;
   the link up request provided to the plurality of invitee devices comprises a customized invitation comprising content corresponding with the link up request or link up location;
   the first location of one of the plurality of invitee devices or the inviter device is a first visual indicator when the one of the plurality of invitee devices or the inviter device is location sharing; and
   the first location of one of the plurality of invitee devices or the inviter device is a second visual indicator when the one of the plurality of invitee devices or the inviter device is not location sharing.

13. The computer-implemented method of claim 1, wherein in response to receiving the first acceptance, the computer-implemented method further comprising:
   activating one or more safety features on the first invitee device, wherein the one or more safety features comprise enabling a third-party device to track the first invitee device and establishing another data channel between the third-party device and the first invitee device to exchange communicates or messages.

14. The computer-implemented method of claim 1, wherein the received link up location is a general location, the computer-implemented method further comprising:
   in response to receiving the first acceptance of the link up request, determining, by the one or more processors, a central location for the link up location based on the first geographic location of the first invitee device and a geographic location of the inviter device, wherein the first proposed route to the link up location is to the central location.

15. The computer-implemented method of claim 1, wherein generating and providing, via the first GUI of the application, the first proposed route to the link up location comprises at least one of:
   a first selectable element comprising a request to rideshare or carpool for the link up;
   a second selectable element comprising an offer for pick up by the inviter device or the plurality of invitee devices; or a third selectable element comprising a media recommendation the first invitee device can output as audio during the first proposed route to the link up location.

16. A data protection system for linking devices and protecting data, the data protection system comprising:
a data processing system comprising memory and one or more processors configured to:
receive, from an inviter device, a link up request associated with a link up location corresponding to a geographical location for a plurality of devices comprising the inviter device and a plurality of invitee devices to meet, the link up request corresponding to a coordinated arrival of the plurality of devices;
establish one or more data channels with the inviter device;
provide the link up request to each of the plurality of invitee devices, the link up request comprising the link up location;
in response to receiving a first acceptance of the link up request from a first invitee device of the plurality of invitee devices, establish the one or more data channels with the first invitee device;
generate and provide, to the first invitee device via a first graphical user interface (GUI) of an application, a first proposed route to the link up location and at least one first location of one of the plurality of invitee devices or the inviter device, wherein the first proposed route is based on a first geographic location of the first invitee device and the link up location;
in response to receiving a second acceptance of the link up request from a second invitee device of the plurality of invitee devices, establish the one or more data channels with the second invitee device;
generate and present, to the second invitee device via a second GUI of the application, a second proposed route to the link up location and at least one first location of one of the plurality of invitee devices or the inviter device, wherein the second proposed route is based on a second geographic location of the second invitee device and the link up location;
collect, via the one or more data channels, environmental data of the inviter device and the plurality of invitee devices;
provide, to the inviter device via a third GUI of the application, a location of the first invitee device and the second invitee device based on the environmental data, wherein the location of the first invitee device and the second invitee device is presented on the third GUI of the application; and
in response to determining at least one of the first invitee device or the second invitee device completed the link up request at the link up location, disconnect the one or more data channels connecting the data processing system and the at least one of the first invitee device or the second invitee device.

17. The data protection system of claim 16, wherein the link up request is associated with a predetermined link up with predetermined invitee devices, the one or more processors further configured to:
determine the predetermined link up based on social media data, wherein the predetermined link up is determined based on identifying trends in the social media data; and
wherein the first proposed route is presented on the first invitee device, and wherein the presentation comprises an estimated time of arrival (ETA) for each of the inviter device, the first invitee device, and the second invitee device.

18. The data protection system of claim 16, the one or more processors further configured to:
determine a stop along the first proposed route or the second proposed route; and
provide an intermediate location to at least one of the first invitee device or the second invitee device.

19. The data protection system of claim 18, the one or more processors further configured to:
receive a list of items associated with the link up request;
determine one or more stops within a geographic area of the link up request that comprises one or more of the list of items in stock;
in response to receiving the first acceptance, offer the one or more stops as selectable elements via the first GUI of the application, wherein determining the stop and providing the intermediate location are in response to receiving a selection of one of the selectable elements;
update the list of items indicating at least one item of the list of items is attributed to the first inviter device; and
update the one or more stops based on either the first proposed route or the second proposed route, wherein each of the one or more stops offered further comprise an incentive presented with a selectable element of the selectable elements.

20. A computer-implemented method for linking devices and protecting data, the computer-implemented method comprising:
receiving, by one or more processors, a link up request comprising a link up location corresponding to a geographical location for a plurality of devices, the link up request corresponding to a coordinated arrival of the plurality of devices;
providing, by the one or more processors to a protection system, an acceptance of the link up request;
in response to the acceptance, establishing, by the one or more processors, a data channel with the protection system;
receiving and presenting, by the one or more processors via a graphical user interface (GUI) of an application, a proposed route to the link up location and at least one location of one of a plurality of invitee devices or an inviter device, wherein the proposed route is based on a first geographic location of the one or more processors and the link up location;
collecting and providing, by the one or more processors via the data channel, environmental data;
receiving and presenting, by the one or more processors via the GUI of the application, a location of the at least one of the plurality of invitee devices or the inviter device; and
in response to determining the one or more processors completed the link up request at the link up location, disconnecting, by the one or more processors, the data channel connecting the one or more processors and the protection system.

\* \* \* \* \*